US011766840B2

(12) United States Patent
Kendall et al.

(10) Patent No.: US 11,766,840 B2
(45) Date of Patent: Sep. 26, 2023

(54) APPARATUS AND METHOD TO ENABLE IN-PLANE BENDING OF HIGH CONTOUR COMPOSITE STRUCTURES IN POST-FORMING OPERATIONS

(71) Applicant: The Boeing Company, Chicago, IL (US)

(72) Inventors: James R. Kendall, Mt. Pleasant, SC (US); Raviendra S. Suriyaarachchi, Kirkland, WA (US); Andrew E. Modin, Charleston, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/461,606

(22) Filed: Aug. 30, 2021

(65) Prior Publication Data
US 2023/0063884 A1  Mar. 2, 2023

(51) Int. Cl.
*B29C 70/34* (2006.01)
*B29C 70/54* (2006.01)
*B29L 31/30* (2006.01)

(52) U.S. Cl.
CPC ............ *B29C 70/345* (2013.01); *B29C 70/54* (2013.01); *B29L 2031/3082* (2013.01)

(58) Field of Classification Search
None
See application file for complete search history.

(56) References Cited

U.S. PATENT DOCUMENTS

| | | | |
|---|---|---|---|
| 7,527,759 B2 | 5/2009 | Lee et al. | |
| 7,708,546 B2 | 5/2010 | Lee et al. | |
| 8,557,165 B2* | 10/2013 | Jones | B29C 33/308 |
| | | | 264/320 |
| 9,162,380 B2 | 10/2015 | Jones et al. | |
| 2014/0037780 A1 | 2/2014 | Jones et al. | |
| 2017/0174850 A1* | 6/2017 | Hofmann | B29C 70/46 |
| 2020/0001516 A1 | 1/2020 | Chapman et al. | |

OTHER PUBLICATIONS

Extended European Search Report (EESR), European Patent Office, dated Jan. 31, 2023, for Application No. EP22190400.6, Applicant The Boeing Company, 5 pages.

* cited by examiner

*Primary Examiner* — Barbara J Musser

(57) ABSTRACT

There is provided a forming apparatus for forming a high contour composite structure. The forming apparatus includes an upper die and a lower die between which a composite charge is formed. The forming apparatus further includes a plurality of load cells, a control system, and an overlay tool assembly coupled to the upper die. The overlay tool assembly has scalloped sections positioned between pairs of the plurality of load cells, and positioned against portion(s) of the composite charge. The composite charge has ply discontinuity features through the one or more portions. The overlay tool assembly denies pressure and a through thickness compaction to the one or more portions of the composite charge during a forming process, to allow one or more plies in the one or more portions to move after the forming process, and to enable in-plane bending of the high contour composite structure in post-forming operations.

23 Claims, 24 Drawing Sheets

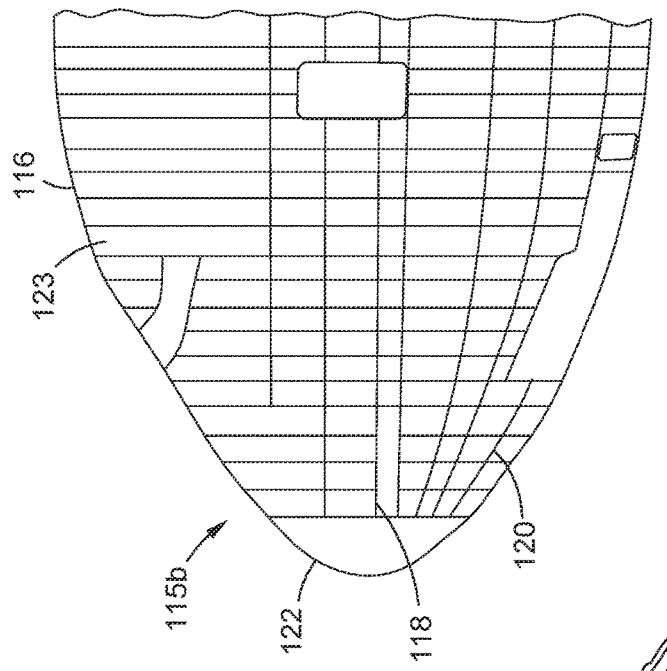
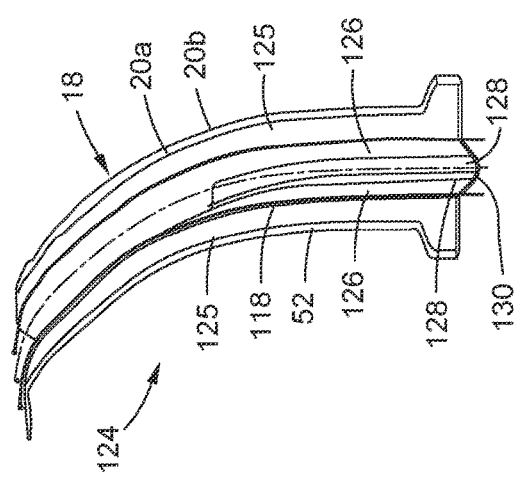
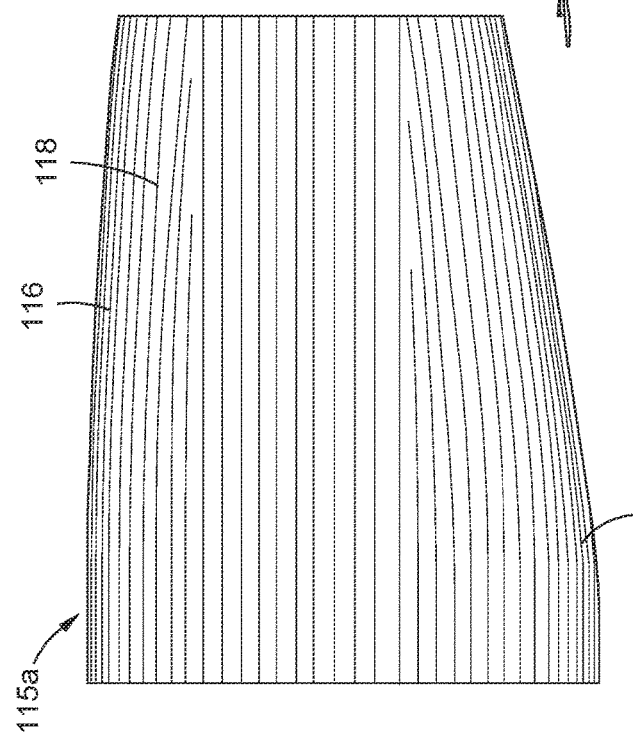

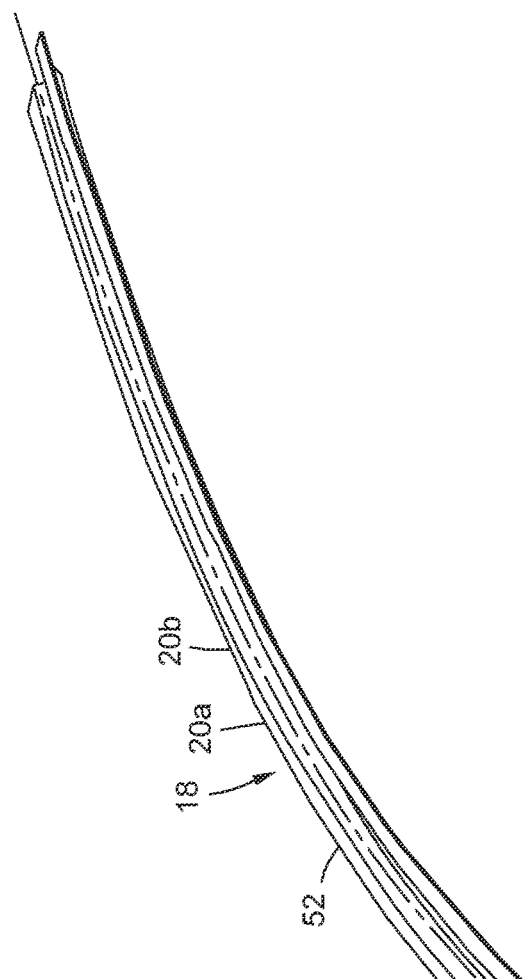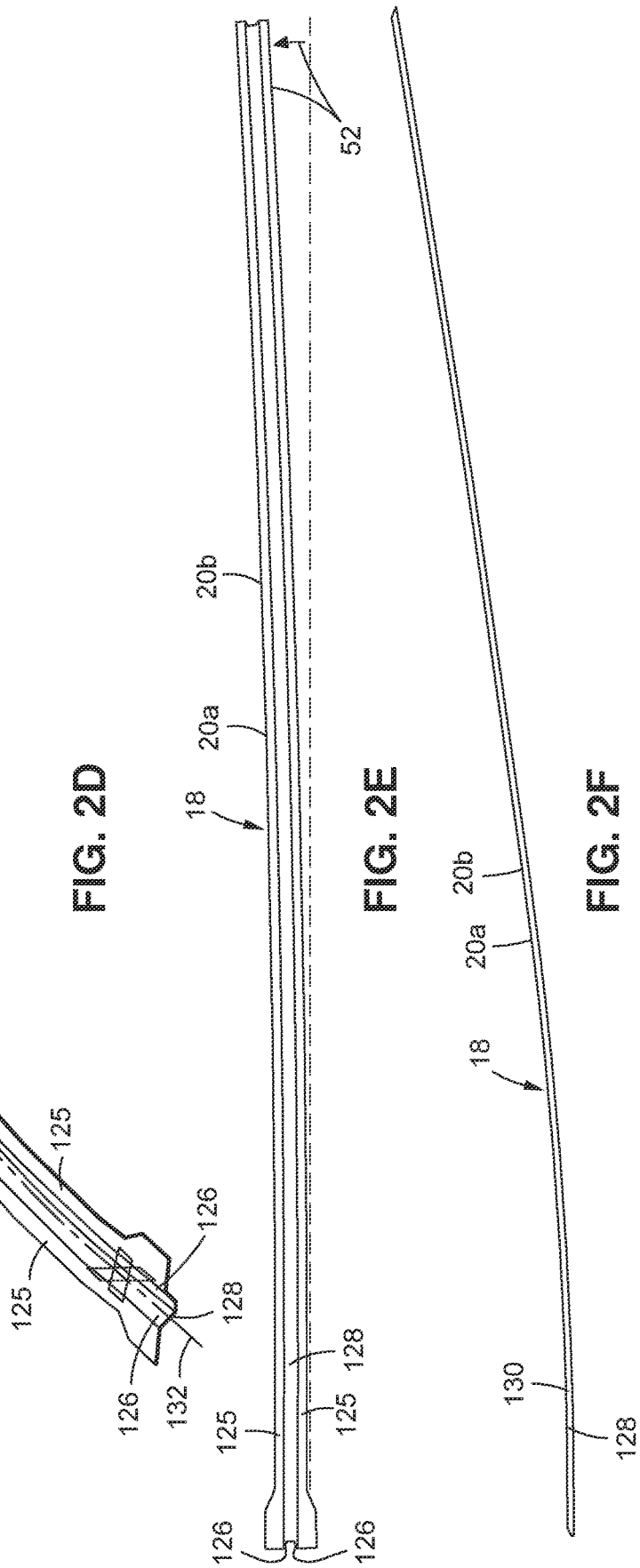

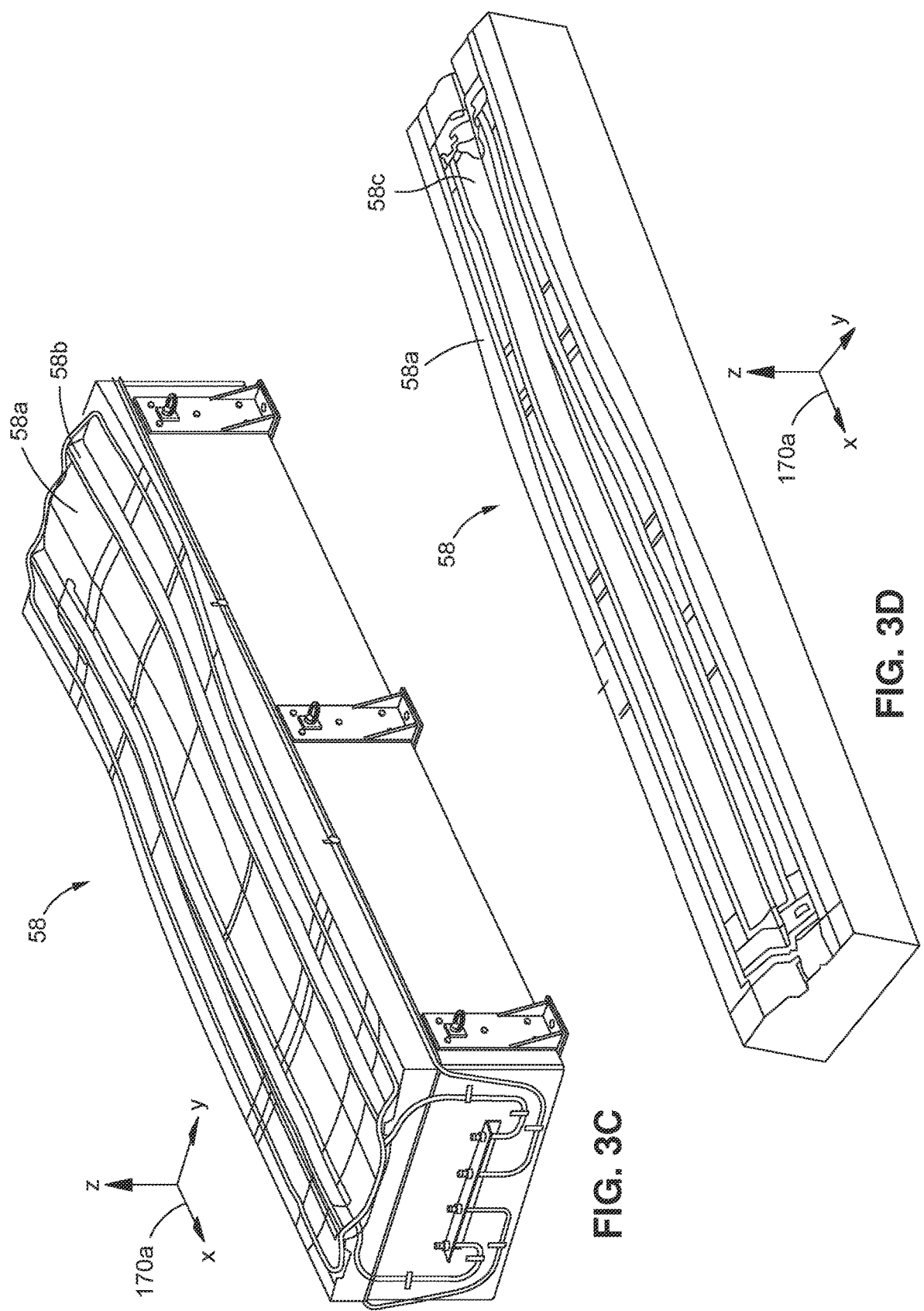

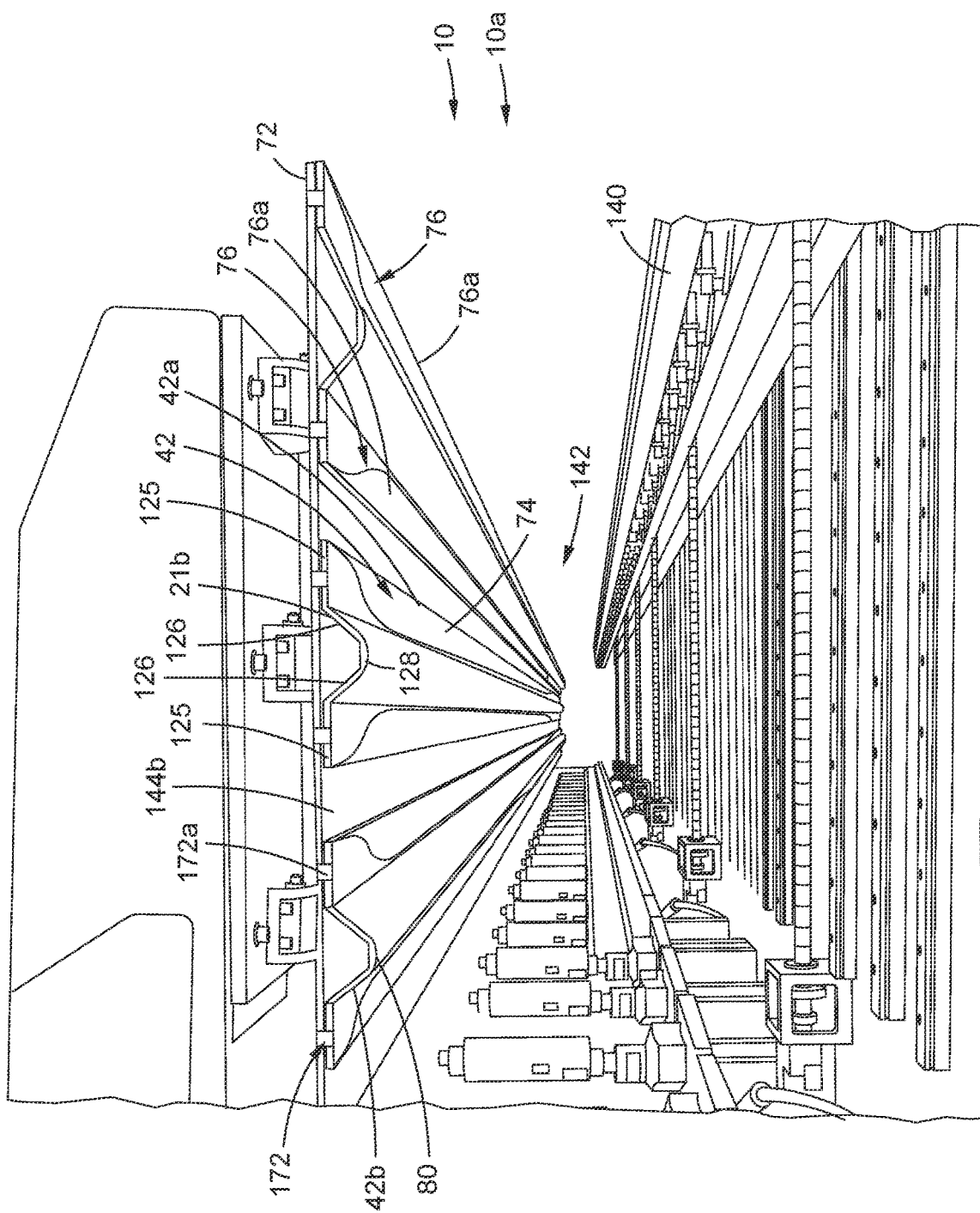

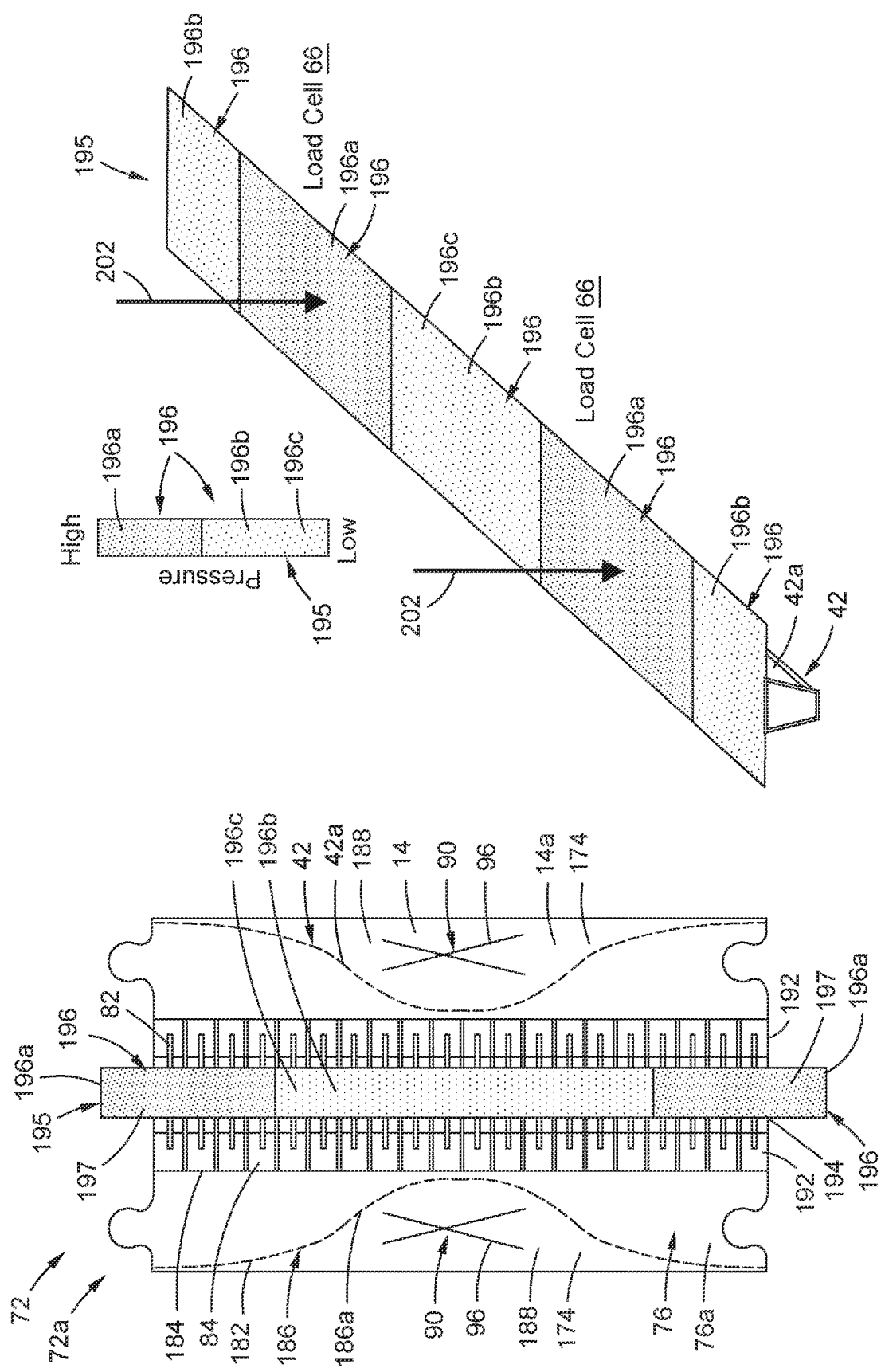

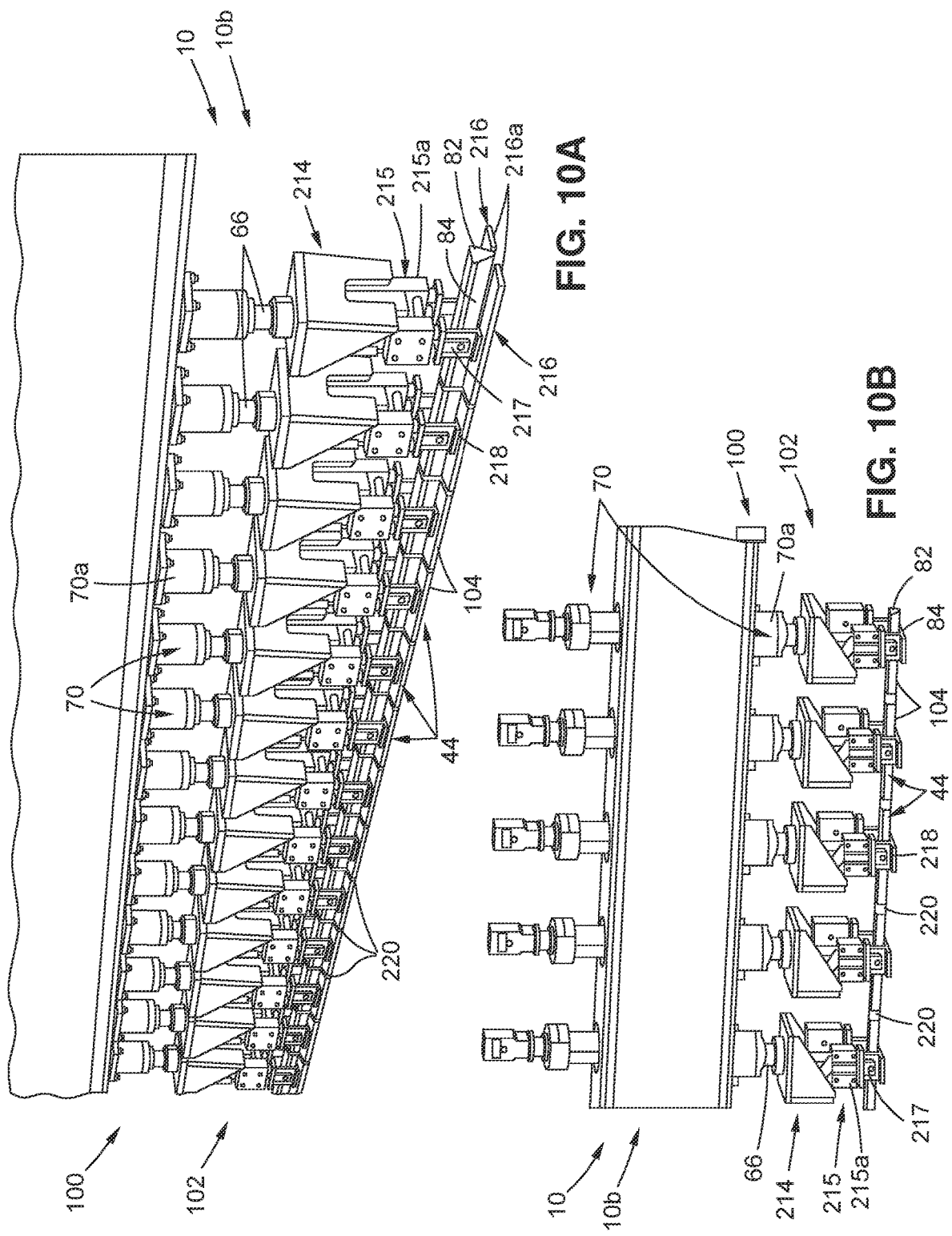

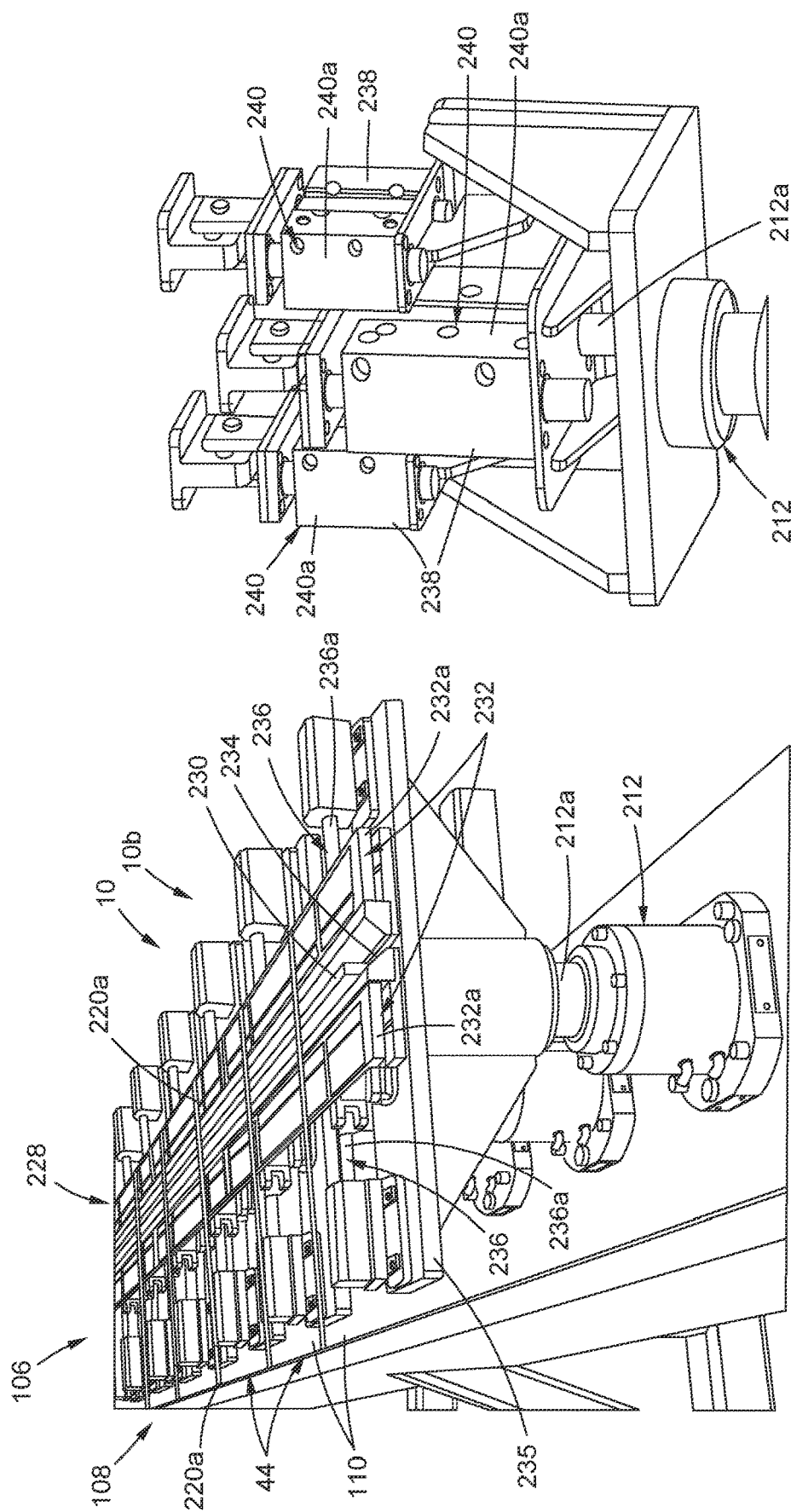

APPARATUS AND METHOD TO ENABLE IN-PLANE BENDING OF HIGH CONTOUR COMPOSITE STRUCTURES IN POST-FORMING OPERATIONS

FIELD

The disclosure relates generally to forming of composite structures, such as those used in the aircraft industry, and relates more particularly, to apparatuses and methods for forming high contour composite structures, such as stiffener members, including stringers, beams, and the like, to enable in-plane bending or steering in post-forming operations.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft. Such composite structures may be formed from flat composite laminate charges comprising multiple stacked composite plies, or layers, laminated together.

High contour composite structures, such as stiffener members, including stringers, beams, and the like, may require complex contours tailored to particular applications. Such high contour composite structures may be formed using a forming apparatus having male and female dies that compress and form a flat composite laminate charge into a desired high contour composite structure having a contoured or high contoured shape along its length. After forming, such high contour composite structures may undergo one or more post-forming operations, for example, removing the formed high contour composite structure from the forming apparatus and bending or steering it into a tool, or bending or steering the high contour composite structure in the forming apparatus. If all of the laminate is consolidated and compacted during forming, it may be difficult to steer or bend portions of the high contour composite structure in post-forming operations, and in-plane bending or steering may lead to wrinkling or buckling.

For example, an aircraft fuselage may contain highly contoured sections, such as the nose and tail sections, where convergence of fuselage barrels drives in-plane bending or steering of stringers, such as hat-shaped stringers having a hat-shaped cross-section with flanges, a web, and a cap. Such in-plane bending or steering may lead to strain accumulation in the flanges of the hat-shaped stringer, and if severe, may result in wrinkling or buckling. Such wrinkling or buckling of the flanges of the hat-shaped stringer is undesirable because it may affect the structural performance of the stringer, resulting in the need to rework the stringer or alter the stringer design. This, in turn, may result in significant production downtime, increased labor, and/or increased material costs. Moreover, such wrinkling in the flanges of the hat-shaped stringer may transmit to a skin panel attached to the hat-shaped stringer, and in turn, may impact fasteners attaching the hat-shaped stringer to the skin panel.

Known systems and methods exist for increasing in-plane bending or steering capability of high contour composite structures, such as stiffener members, including stringers, beams, and the like. For example, one such known system and method for increasing in-plane bending or steering capability of a high contour stringer includes using fabric to lay up or form the high contour stringer. Because the fabric drapes more easily, as compared to axial tape, a tighter curvature may be achieved, and quality issues may be avoided or minimized. However, the use of such fabric may be expensive, as compared to axial tape, and may add unwanted weight to the high contour stringer, to achieve a similar stiffness capability as axial tape. Thus, in-plane bending or steering may limit a material type used to form the stringer. Further, in-plane bending or steering may limit a stringer width that may be used for a given curvature over a length of the stringer.

Another known system and method for increasing in-plane bending or steering capability of a high contour stringer includes adding a scarf splice to the stringer to allow fibers of the stringer to break, and to divide the stringer into smaller parts. However, adding such a scarf splice to the stringer may increase the part count and may increase the time for assembly. This may result in increased manufacturing costs. Further, if the stringer is formed in a stringer forming system designed for forming full-length stringers, adding such a scarf splice to the stringer may increase the fabrication time of the stringer. This may result in increased manufacturing costs.

Yet another known system and method for increasing in-plane bending or steering capability of a high contour stringer includes hand layup of the high contour stringer in a ply-by-ply manner to a net shape, where each ply is laid up by hand over a die or other tool. However, such hand layup may be labor intensive and time consuming, and may result in increased manufacturing costs.

Accordingly, there is a need for an apparatus and method for forming high contour composite structures, such as stiffener members, including stringers, beams, and the like, that enable in-plane bending or steering and increase in-plane bending or steering capability of such high contour composite structures in post-forming operations, to prevent, or substantially prevent, wrinkling or buckling, in contoured regions, for example, the flanges, web, and cap of hat-shaped stringers, that use axial tape, that avoid the use of hand layup techniques and scarf splices, and that provide advantages over known apparatuses and methods.

SUMMARY

Example implementations of the present disclosure provide apparatuses and methods to enable in-plane bending or steering and increase in-plane bending or steering capability of high contour composite structures in post-forming operations, to prevent, or substantially prevent, wrinkling or buckling. As discussed in the below detailed description, versions of the apparatuses and methods may provide significant advantages over known apparatuses and methods.

In a version of the disclosure, there is provided a forming apparatus for forming a high contour composite structure. The forming apparatus comprises an upper die and a lower die between which a composite charge is formed. The upper die has upper die portions that are slidably displaceable, via first actuators. The lower die has pairs of die blocks spaced apart to define a die cavity, and slidably displaceable, via second actuators.

The forming apparatus further comprises a plurality of load cells coupled to the first actuators, to monitor pressure applied to the composite charge by the first actuators and the second actuators. The forming apparatus further comprises a control system having a controller to operably control the first actuators and the second actuators.

The forming apparatus further comprises an overlay tool assembly coupled to the upper die. The overlay tool assembly has scalloped sections positioned between pairs of the plurality of load cells along a length of the upper die, and positioned against one or more portions of the composite charge during a forming process. The composite charge has ply discontinuity features formed through the one or more portions and aligned with the scalloped sections. The overlay tool assembly denies pressure and a through thickness compaction to the one or more portions of the composite charge during the forming process, to allow one or more plies in the one or more portions to move after the forming process, and to enable in-plane bending of the high contour composite structure, formed by the composite charge, in one or more post-forming operations.

In another version of the disclosure, there is provided a forming apparatus for forming a high contour composite structure. The forming apparatus comprises an upper die assembly. The upper die assembly comprises a plurality of compressor module assemblies comprising compressor modules movably coupled to upper actuator assemblies, and coupled to a pair of lateral pressure plates, with a punch disposed between the pair of lateral pressure plates.

The forming apparatus further comprises a lower die assembly. The lower die assembly comprises a lower pallet coupled to lower actuator assemblies, and having a presser apparatus disposed between pairs of die portions spaced apart to define a lower die cavity. The lower die assembly is separate from the upper die assembly, between which a composite charge is formed.

The forming apparatus further comprises a control system. The control system has a controller to operably control the upper actuator assemblies and the lower actuator assemblies. The upper die assembly, the lower die assembly, or a combination of the upper die assembly and the lower die assembly, is segmented into separate and independently movable segments that are controlled, with the controller, to vary pressure and a through thickness compaction to one or more portions of the composite charge, along a length of the composite charge, during a forming process, to allow one or more plies in the one or more portions to move after the forming process, and to enable in-plane bending of the high contour composite structure, formed by the composite charge, in one or more post-forming operations.

In another version of the disclosure, there is provided a method to enable in-plane bending of a high contour composite structure in one or more post-forming operations. The method comprises the step of providing a forming apparatus. The forming apparatus comprises an upper die and a lower die. The upper die has upper die portions that are slidably displaceable, via first actuators, and the lower die has pairs of die blocks spaced apart to define a die cavity, and slidably displaceable, via second actuators.

The forming apparatus further comprises a plurality of load cells coupled to the first actuators. The forming apparatus further comprise a control system having a controller. The forming apparatus further comprises an overlay tool assembly coupled to the upper die. The overlay tool assembly has scalloped sections positioned between pairs of the plurality of load cells, along a length of the upper die.

The method further comprises the step of positioning a composite charge between the upper die and the lower die. The composite charge has ply discontinuity features formed through a thickness of one or more portions of the composite charge. The method further comprises the step of aligning the ply discontinuity features between the pairs of the plurality of load cells.

The method further comprises the step of positioning the scalloped sections of the overlay tool assembly against the one or more portions of the composite charge, and aligning the scalloped sections with the ply discontinuity features. The method further comprises the step of forming the composite charge with the forming apparatus and a forming process.

The method further comprises the step of using the overlay tool assembly to deny pressure and a through thickness compaction to the one or more portions of the composite charge, during the forming process. The method further comprises the step of obtaining the high contour composite structure enabled for in-plane bending in one or more post-forming operations.

In another version of the disclosure, there is provided a method to enable in-plane bending of a high contour composite structure in one or more post-forming operations. The method comprises the step of providing a forming apparatus. The forming apparatus comprises an upper die assembly. The upper die assembly comprises a plurality of compressor module assemblies comprising compressor modules movably coupled to upper actuator assemblies, and coupled to a pair of lateral pressure plates, with a punch disposed between the pair of lateral pressure plates.

The forming apparatus further comprises a lower die assembly. The lower die assembly comprises a lower pallet coupled to lower actuator assemblies, and having a presser apparatus disposed between pairs of die portions spaced apart to define a lower die cavity. The lower die assembly is separate from the upper die assembly.

The forming apparatus further comprises a control system having a controller. One of, the upper die assembly, the lower die assembly, or a combination of the upper die assembly and the lower die assembly, is segmented into separate and independently movable segments.

The method further comprises the step of positioning a composite charge between the upper die assembly and the lower die assembly. The method further comprises the step of forming the composite charge with the forming apparatus and a forming process.

The method further comprises the step of using the controller to independently control the separate and independently movable segments, to vary pressure and a through thickness compaction to one or more portions of the composite charge, along a length of the composite charge, during the forming process. The method further comprises the step of obtaining the high contour composite structure enabled for in-plane bending in one or more post-forming operations.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 2A is an illustration of an aircraft contour modeling diagram showing a side view of an aircraft fuselage portion showing in-plane contours and out-of-plane contours;

FIG. 2B is an illustration of an aircraft contour modeling diagram of a side view of an aircraft nose portion showing in-plane contours and out-of-plane contours;

FIG. 2C is an illustration of a contour modeling diagram of a bottom front perspective view of a hat-shaped stringer showing an in-plane bending against flanges and an out-of-plane bending against a cap;

FIG. 2D is an illustration of a bottom side perspective view of the hat-shaped stringer of FIG. 2C;

FIG. 2E is an illustration of a bottom view of the hat-shaped stringer of FIG. 2D showing an in-plane bending against the flange;

FIG. 2F is an illustration of a side view of the hat-shaped stringer of FIG. 2E showing an out-of-plane bending against the cap;

FIG. 3C is an illustration of a front perspective view of an exemplary version of a male tool;

FIG. 3D is an illustration of a front perspective view of an exemplary version of a female tool;

FIG. 5A is an illustration of an enlarged front perspective view of an exemplary version of a forming apparatus of the disclosure with a version of an overlay tool assembly attached to an upper die;

FIG. 5C is an illustration of a top view of a portion of an upper die with another version of an overlay tool assembly coupled to the upper die, and showing a composite charge with relief cuts;

FIG. 5D is an illustration of a schematic diagram showing a pressure gradient with pressure zones on the overlay tool assembly of FIG. 5C;

FIG. 10A is an illustration of an enlarged front perspective view of a segmented upper die assembly of another exemplary version of a forming apparatus of the disclosure;

FIG. 10B is an illustration of an enlarged right side perspective view of the segmented upper die assembly of FIG. 10A;

FIG. 11A is an illustration of an enlarged front perspective view of a segmented lower die assembly of another exemplary version of a forming apparatus of the disclosure;

FIG. 11B is an illustration of an enlarged back perspective view of a lower actuator assembly for the segmented lower die assembly of FIG. 11A;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version.

Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
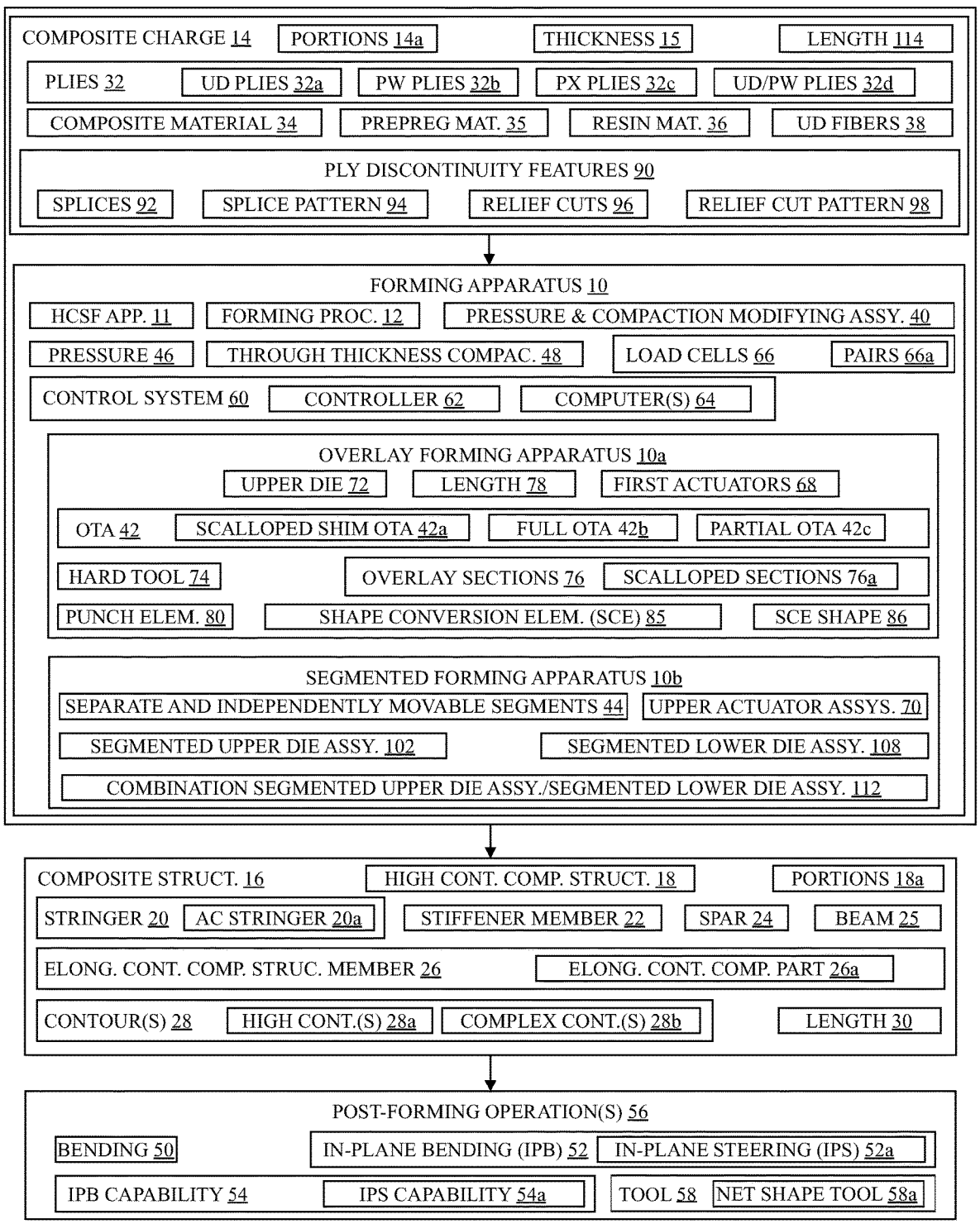
FIG. 1 is an illustration of a functional block diagram showing exemplary versions of a forming apparatus of the disclosure.

Now referring to the Figures, FIG. 1 is an illustration of a functional block diagram showing exemplary versions of a forming apparatus 10, including an overlay forming apparatus 10a, of the disclosure, and a segmented forming apparatus 10b, of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustration of the forming apparatus 10 in FIG. 1 is not meant to imply physical or architectural limitations to the manner in which an illustrative example may be implemented. Other components in addition to or in place of the ones illustrated may be used. Some components may be unnecessary.

The forming apparatus 10, including the overlay forming apparatus 10a, and the segmented forming apparatus 10b, may be in the form of a high contour stringer former (HCSF) apparatus 11 (see FIG. 1), or another suitable forming apparatus. The forming apparatus 10 including the overlay forming apparatus 10a, and the segmented forming apparatus 10b, is an automated apparatus, and is used in a forming process 12 (see FIG. 1), which is an automated forming process. The forming apparatus 10, including the overlay forming apparatus 10a, and the segmented forming apparatus 10b, and the forming process 12, are used to form a composite charge 14 (see FIG. 1) into a composite structure 16 (see FIG. 1), such as a high contour composite structure 18 (see FIG. 1).

The composite structure 16, such as the high contour composite structure 18, may comprise a stringer 20 (see FIG. 1), such as an aircraft stringer 20a (see FIG. 1), or another shaped stringer, discussed below. As shown in FIG. 1, the composite structure 16, such as the high contour composite structure 18, may further comprise a stiffener member 22, a spar 24, a beam 25, or another suitable high contour composite structure. The high contour composite structure 18, formed from the composite charge 14 using the forming apparatus 10 and the forming process 12 disclosed herein is preferably an elongate contoured composite structural member 26 (see FIG. 1), such as an elongate contoured composite part 26a (see FIG. 1), that can be used in a variety of industries and applications including, but not limited to, the manufacture of aircraft 280a (see FIG. 14) and other aerospace structures and vehicles.

The high contour composite structure 18 has one or more contours 28 (see FIG. 1), such as one or more high contours 28a (see FIG. 1), or complex contours 28b (see FIG. 1), along its length 30 (see FIG. 1). The high contour composite structure 18, as disclosed herein, can define various contours 28, such as high contours 28a, or complex contours 28b, and configurations, including curves, angles, flanges, complex contours, high contours, and the like. As used herein, "high contour" means a constant or varying contour, such as a complex contour, or curvature, in the direction of the length of a composite charge.

The composite charge 14 that is constrained and formed into the high contour composite structure 18, using the forming apparatus 10 and the forming process 12, is preferably in the form of a composite charge 14 that is flat, or a substantially flat, and that is uncured. The composite charge 14 may be in the form of a composite laminate charge, a composite stringer charge, a dry composite charge, or another suitable composite charge. As shown in FIG. 1, the composite charge 14 preferably comprises plies 32, or layers, of one or more composite materials 34, such as prepreg materials 35, which may be knitted or woven fabrics preimpregnated with a resin material 36, such as a resin binder, for example, carbon fiber epoxy prepreg materials. The composite material 34 may comprise carbon fiber reinforced polymer (CFRP) materials, including plastic materials known in the art of composite part manufacturing. As shown in FIG. 1, the plies 32 may comprise unidirectional (UD) fiber plies 32a, also referred to as axial fiber plies, made of unidirectional fibers 38, also referred to as axial fibers. The unidirectional fibers 38 run parallel to each other in the same direction. The plies 32 may further comprise bidirectional fiber reinforcement impregnated with, and held in, a suitable resin matrix, such as a thermoset, i.e., prepregs. As shown in FIG. 1, the plies 32 may further comprise plain weave (PW) plies 32b made of plain weave material, plain cross-weave (PX) plies 32c made of plain cross-weave material, unidirectional (UD)/plain weave (PW) plies 32d made of unidirectional fibers 38 and plain weave material, or another suitable type of ply material. The composite material 34 may further comprise glass fibers, glass fiber reinforced plastic (GFRP), fiberglass, or other suitable composite materials. The dry composite charges may be formed from fabrics that have been pre-treated with resin materials 36, or may be formed from dry fabric plies having tackifiers that tack the fabric plies together in a desired shape and/or alignment prior to resin infusion.

As shown in FIG. 1, the forming apparatus 10 comprises a pressure and compaction modifying assembly 40. In the forming apparatus 10, such as in the form of the overlay forming apparatus 10a, the pressure and compaction modifying assembly 40 is in the form of an overlay tool assembly 42. In the forming apparatus 10, such as in the form of the segmented forming apparatus 10b, the pressure and compaction modifying assembly 40 is in the form of separate and independently movable segments 44.

The illustrative versions disclosed herein recognize and take into account that denying or relieving pressure 46 (see FIG. 1) and a through thickness compaction 48 (see FIG. 1), or varying the pressure 46 and the through thickness compaction 48, across portions 14a (see FIG. 1) of the composite charge 14, during the forming process 12 of the high contour composite structure 18, with the forming apparatus 10, enables bending 50 (see FIG. 1), for example, in-plane bending 52 (see FIG. 1), also referred to as in-plane steering 52a (see FIG. 1), and increases in-plane bending capability 54 (see FIG. 1), also referred to as in-plane steering capability 54a (see FIG. 1), of portions 18a of the high contour composite structure 18 during one or more post-forming operations 56. The one or more post-forming operations 56 comprise one or more of, bending 50 or manipulating the high contour composite structure 18 on the forming apparatus 10; or removing the high contour composite structure 18 from the forming apparatus 10, and placing the high contour composite structure 18 on a tool 58 (see FIGS. 1, 3C-3D), such as a net shape tool 58a (see FIGS. 1, 3C-3D), and bending 50 or manipulating the high contour composite structure 18 on the tool 58, such as the net shape tool 58a; or bending 50 or manipulating the high contour composite structure 18, after removing the high contour composite structure 18 from the forming apparatus 10, and before placing the high contour composite structure 18 on the tool 58, such as the net shape tool 58a; or another suitable post-forming operation. For example, bending 50 or manipulating the high contour composite structure 18, after removing the high contour composite structure 18 from the forming apparatus 10, and before placing the high contour composite structure 18 on the tool 58, may comprise bending 50 or manipulating the high contour composite structure 18 in mid-air above the tool 58, after it is removed from the forming apparatus 10, or bending 50 or manipulating the high contour composite structure 18 at another suitable location, after removal from the forming apparatus 10 and before placement on the tool 58.

In addition, the bending 50 in the post-forming operations 56 may be carried out using robot arms, or another suitable automated apparatus, for example, to make initial bending of the high contour composite structure 18 on the forming apparatus 10, or in mid-air off the forming apparatus 10 and above or near the tool 58, and before the high contour composite structure 18 is placed on the tool 58. Once the initially bent high contour composite structure 18 is placed on the tool 58, it may be further bent or manipulated into a net shape on the tool 58, such as a net shape tool 58a (see FIG. 1).

As shown in FIG. 1, the forming apparatus 10, such as in the form of the overlay forming apparatus 10a, or the segmented forming apparatus 10b, comprises a control system 60 for operably controlling operations of the forming apparatus 10. The control system 60 comprises a controller 62 (see FIG. 1) and one or more computers 64 (see FIG. 1). The one or more computers 64 comprise one or more portable computers such as laptop computers, one or more desk top computers, one or more programmable logic controllers, or other suitable computers or computing devices. In one exemplary version, the one or more computers 64 use a control program which may include a software program, or an algorithm, that determines how the forming should progress and the sequential operations of the forming apparatus 10 and the forming process 12. The control system 60 may also receive signals from a plurality of load cells 66 (see FIG. 1) which may be used to monitor pressure 46 applied to the composite charge 14 by actuators, including first actuators 68 (see FIG. 1), of the forming apparatus 10, such as the overlay forming apparatus 10a, or by actuator assemblies, including upper actuator assemblies 70 (see FIG. 1), of the forming apparatus 10, such as the segmented forming apparatus 10b. The control system 60 may be operatively controlled by an operator or user.

As shown in FIG. 1, in one exemplary version, the forming apparatus 10, such as in the form of the overlay forming apparatus 10a, comprises the overlay tool assembly (OTA) 42 coupled to an upper die 72 (see also FIGS. 3A-3B) of the forming apparatus 10, such as in the form of the overlay forming apparatus 10a. The overlay tool assembly 42 may be in the form of a scalloped shim overlay tool assembly (OTA) 42a (see FIG. 1). The overlay tool assembly 42, such as in the form of the scalloped shim overlay tool assembly 42a, comprises a hard tool 74 (see FIG. 1) that is formed and attached to the upper die 72 of an existing forming apparatus 10 or a new forming apparatus 10.

As shown in FIG. 1, the overlay tool assembly 42, such as the scalloped shim overlay tool assembly 42a, comprises overlay sections 76, such as in the form of scalloped sections 76a. During the forming process 12, the overlay sections 76, such as the scalloped sections 76a, are positioned between pairs 66a (see FIG. 1) of the plurality of load cells 66 along a length 78 (see FIGS. 1, 3A) of the upper die 72, and positioned against one or more portions 14a of the composite charge 14.

As further shown in FIG. 1, in one version, the overlay tool assembly 42, such as the scalloped shim overlay tool assembly 42a, comprises a full overlay tool assembly (OTA) 42b (see also FIG. 5A) that is designed or configured for attachment to the upper die 72 and that includes a punch element 80 designed or configured to function and take the place of a punch 82 (see FIG. 5B) on the forming apparatus 10 that has been removed or not included. As further shown in FIG. 1, in another version, the overlay tool assembly 42, such as the scalloped shim overlay tool assembly 42a, comprises a partial overlay tool assembly (OTA) 42c (see also FIG. 5B) that is designed or configured for attachment to the upper die 72 along sides 84 (see FIG. 5B), such as opposite sides, of the punch 82 existing on the forming apparatus 10.

The overlay tool assembly 42, such as the scalloped shim overlay tool assembly 42a, may further comprise a shape conversion element (SCE) 85 (see FIG. 1) having a shape conversion element (SCE) shape 86. The shape conversion element 85 is configured for coupling over the punch 82 existing on the forming apparatus 10, in order to convert a punch shape 88 (see FIG. 5B) of the punch 82 to the shape conversion element shape 86 of the shape conversion element 85 that is different than the punch shape 88.

The composite charge 14 formed in the forming apparatus 10, such as the overlay forming apparatus 10a, preferably has ply discontinuity features 90 (see FIG. 1) formed through a thickness 15 (see FIG. 1) of one or more portions 14a of the composite charge 14. The ply discontinuity features 90 are aligned with the overlay sections 76, such as the scalloped sections 76a, during the forming process 12.

In another version, the ply discontinuity features 90 comprise splices 92 (see FIG. 1) formed in a splice pattern 94 (see FIG. 1) and formed or introduced in one or more of the plies 32 through the thickness 15 of the one or more portions 14a of the composite charge 14. The splices 92 may comprise one of, a partial splice 92a (see FIG. 6), a full zig-zag splice 92b (see FIG. 7), or another suitable type of splice.

In one version, the ply discontinuity features 90 comprise relief cuts 96 (see FIG. 1) cut in a relief cut pattern 98 (see FIG. 1) and formed or introduced in one or more of the plies 32 through the thickness 15 of the one or more portions 14a of the composite charge 14. The relief cuts 96 may comprise one or more of, dart-shaped relief cuts 96a (see FIG. 8), diamond-shaped relief cuts 96b (see FIG. 9), or another suitable relief cut.

As discussed in further detail below, during the forming process 12, the overlay tool assembly 42, such as the scalloped shim overlay tool assembly 42a, denies or relieves pressure 46 and through thickness compaction 48 on one or more portions 14a of the composite charge 14, to enable in-plane bending 52, or in-plane steering 52a, of the high contour composite structure 18 in one or more post-forming operations 56.

As shown in FIG. 1, in another exemplary version, the forming apparatus 10, such as in the form of the segmented forming apparatus 10b, comprises separate and independently movable segments 44. In one version, the forming apparatus 10, such as in the form of the segmented forming apparatus 10b, comprises an upper die assembly 100 comprising a segmented upper die assembly 102 (see FIGS. 1, 10A), where the separate and independently movable segments 44 comprise segmented upper die assembly segments 104 (see FIG. 10A). In another version, the forming apparatus 10, such as in the form of the segmented forming apparatus 10b, comprises a lower die assembly 106 comprising a segmented lower die assembly 108 (see FIGS. 1, 11A), where the separate and independently movable segments 44 comprise segmented lower die assembly segments 110 (see FIG. 11A). In yet another version, the forming apparatus 10, such as in the form of the segmented forming apparatus 10b, comprises a combination 112 of both the segmented upper die assembly 102 and the segmented lower die assembly 108.

As discussed in further detail below, during the forming process 12, the separate and independently movable segments 44 of one of, the segmented upper die assembly 102, the segmented lower die assembly 108, or the combination 112 of the segmented upper die assembly 102 and the segmented lower die assembly 108, are controlled, with the controller 62, to vary pressure 46 and the through thickness compaction 48 to the one or more portions 14a of the composite charge 14, along a length 114 (see FIG. 1) of the composite charge 14, to allow one or more plies 32 in the one or more portions 14a to move after the forming process 12, and to enable in-plane bending 52, or in-plane steering 52a, of the high contour composite structure 18, formed by the composite charge 14, in one or more post-forming operations 56.

Now referring to FIG. 2A, FIG. 2A is an illustration of an aircraft contour modeling diagram 115a showing a side view of an aircraft fuselage portion 116. As shown in FIG. 2A, the aircraft fuselage portion 116 shows in-plane contours 118 and out-of-plane contours 120.

Now referring to FIG. 2B, FIG. 2B is an illustration of another aircraft contour modeling diagram 115b showing a side view of an aircraft nose portion 122. As shown in FIG. 2B, the aircraft nose portion 122 shows an in-plane contour 118 and an out-of-plane contour 120. At the aircraft nose portion 122, a diameter of a barrel 123 of the aircraft fuselage portion 116 decreases, and convergence of the barrel 123 drives in-plane bending 52 (see FIG. 1) or in-plane steering 52a (see FIG. 1) of high contour composite structures 18 (see FIGS. 1, 2C), such as stringers 20 (see FIG. 1).

Now referring to FIG. 2C, FIG. 2C is an illustration of a contour modeling diagram 124 showing a bottom front perspective view of a high contour composite structure 18, such as in the form of an aircraft stringer 20a, for example, a hat-shaped stringer 20b. As shown in FIG. 2C, the high contour composite structure 18, such as in the form of aircraft stringer 20a, for example, the hat-shaped stringer 20b, includes flanges 125, webs 126, or sides, and a cap 128. FIG. 2C shows in-plane contours 118 in the flanges 125, and shows an in-plane bending 52 against the flanges 125. FIG. 2C further shows an out-of-plane contour 120 in the cap 128, and shows an out-of-plane bending 130 against the cap 128.

Now referring to FIG. 2D, FIG. 2D is an illustration of a bottom side perspective view of the high contour composite structure 18, such as in the form of the aircraft stringer 20a, for example, the hat-shaped stringer 20b, of FIG. 2C. FIG. 2D shows the flanges 125, webs 126, or sides, a cap 128, and a centerline 132 of the high contour composite structure 18, such as in the form of the aircraft stringer 20a, for example, the hat-shaped stringer 20b. FIG. 2D further shows the in-plane bending 52 against the flanges 125. The in-plane bending 52 is in an XY plane 134a (see FIG. 2H).

Now referring to FIG. 2E, FIG. 2E is an illustration of a bottom view of the high contour composite structure 18, such as in the form of the aircraft stringer 20a, for example, the hat-shaped stringer 20b, of FIG. 2D. FIG. 2D shows the flanges 125, webs 126, or sides, a cap 128, and centerline 132 of the high contour composite structure 18, such as in the form of the aircraft stringer 20a, for example, the hat-shaped stringer 20b. FIG. 2E further shows the in-plane bending 52 against the flanges 125. The in-plane bending 52 is in the XY plane 134a (see FIG. 2H).

Now referring to FIG. 2F, FIG. 2F is an illustration of a side view of the high contour composite structure 18, such as in the form of the aircraft stringer 20a, for example, the hat-shaped stringer 20b, of FIG. 2E. FIG. 2F shows the cap 128 and shows the out-of-plane bending 130 against the cap 128. The out-of-plane bending 130 is in an XZ plane 134b (see FIG. 2H).

Figure 2G:
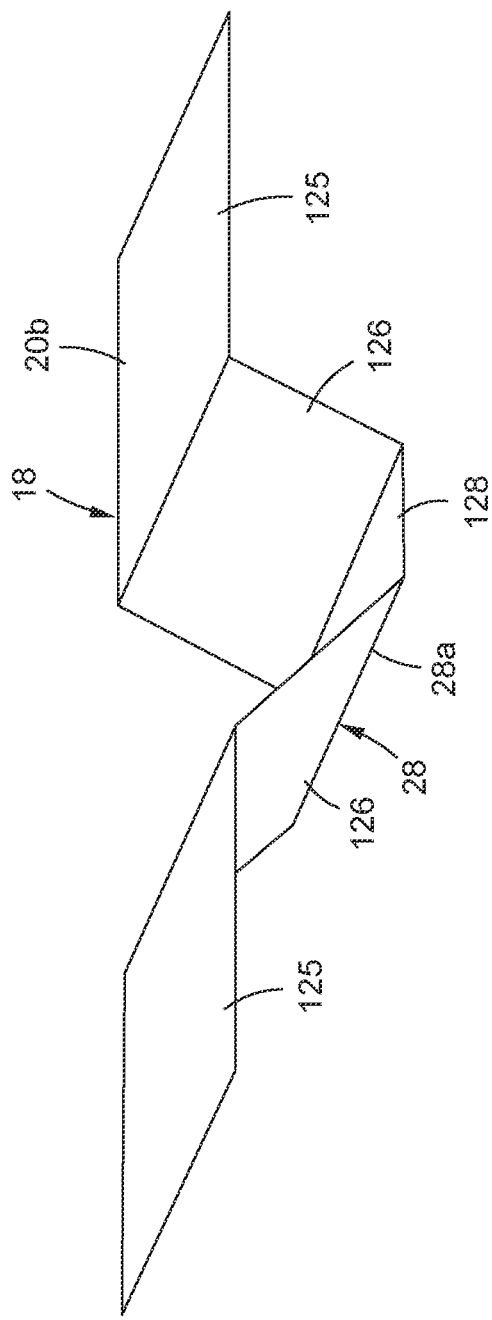
FIG. 2G is an illustration of a perspective front view of a hat-shaped stringer.

Now referring to FIG. 2G, FIG. 2G is an illustration of a perspective front view of a high contour composite structure 18, such as in the form of a hat-shaped stringer 20b. As shown in FIG. 2G, the high contour composite structure 18, such as in the form of the hat-shaped stringer 20b, includes flanges 125, webs 126, or sides, and a cap 128. As shown in FIG. 2G, the high contour composite structure 18, such as in the form of the hat-shaped stringer 20b, has contours 28, such as high contours 28a.

Figure 2H:
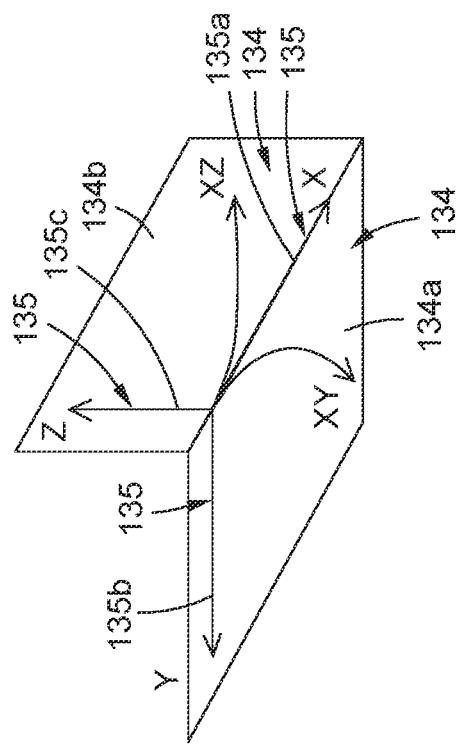
FIG. 2H is an illustration of a diagram of axes and planes of the hat-shaped stringer of FIG. 2G.

Now referring to FIG. 2H, FIG. 2H is an illustration of a diagram of planes 134 and axes 135 of the high contour composite structure 18, such as in the form of the hat-shaped stringer 20b, of FIG. 2G. As shown in FIG. 2H, the planes 134 include the XY plane 134a, and the XZ plane 134b. As further shown in FIG. 2H, the axes 135 include an X-axis 135a, a Y-axis 135b, and a Z-axis 135c. Bending against the flanges 125 of the high contour composite structure 18, such as in the form of the hat-shaped stringer 20b, of FIG. 2G, is in the XY plane 134a. Bending against the cap 128 of the high contour composite structure 18, such as in the form of the hat-shaped stringer 20b, of FIG. 2G, is in the XZ plane 134b.

Figure 3A:
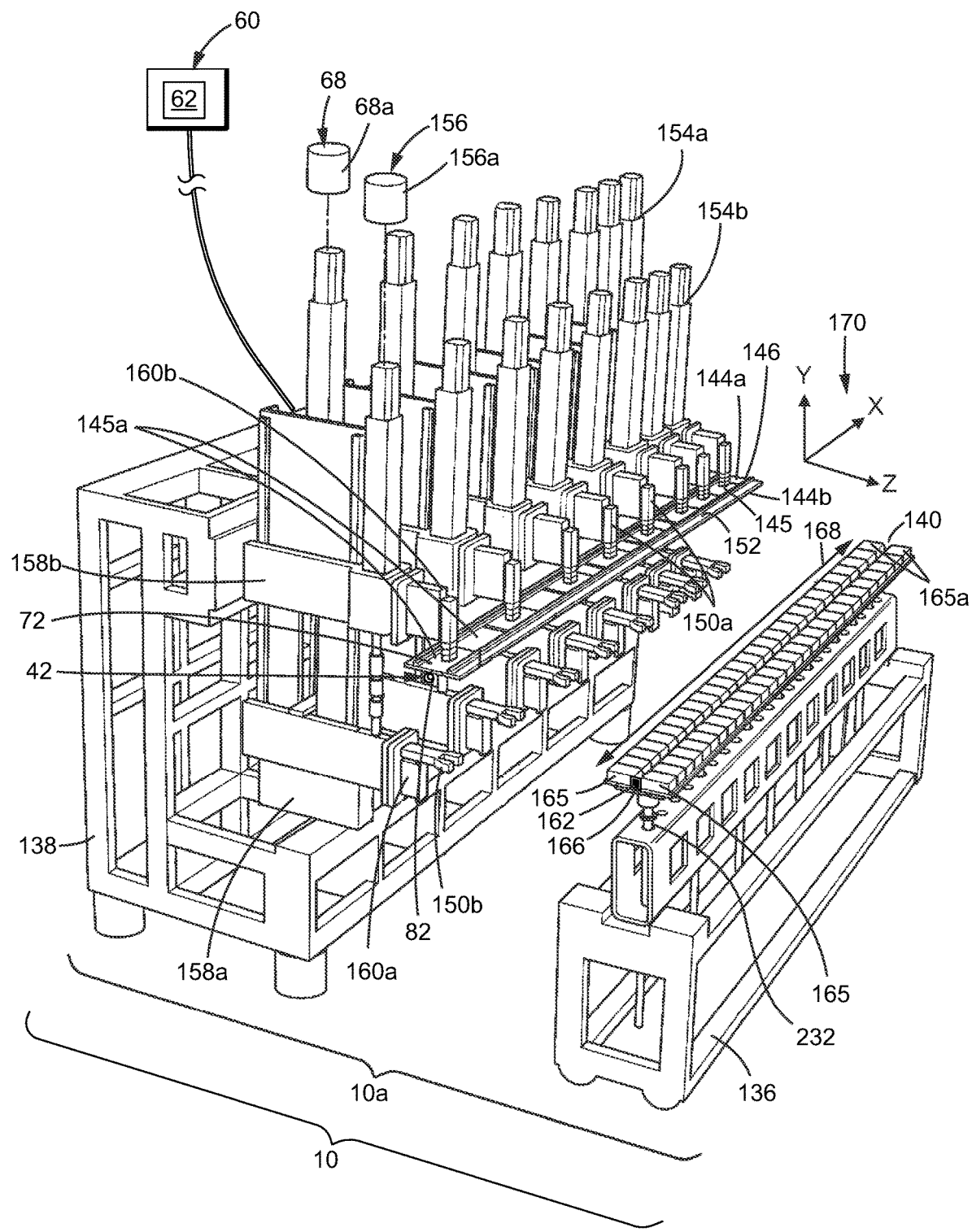
FIG. 3A is an illustration of a front perspective view of an exemplary version of a forming apparatus of the disclosure with an overlay tool assembly attached to an upper die, and showing a portable carrier portion uncoupled from a forming portion.
Figure 3B:
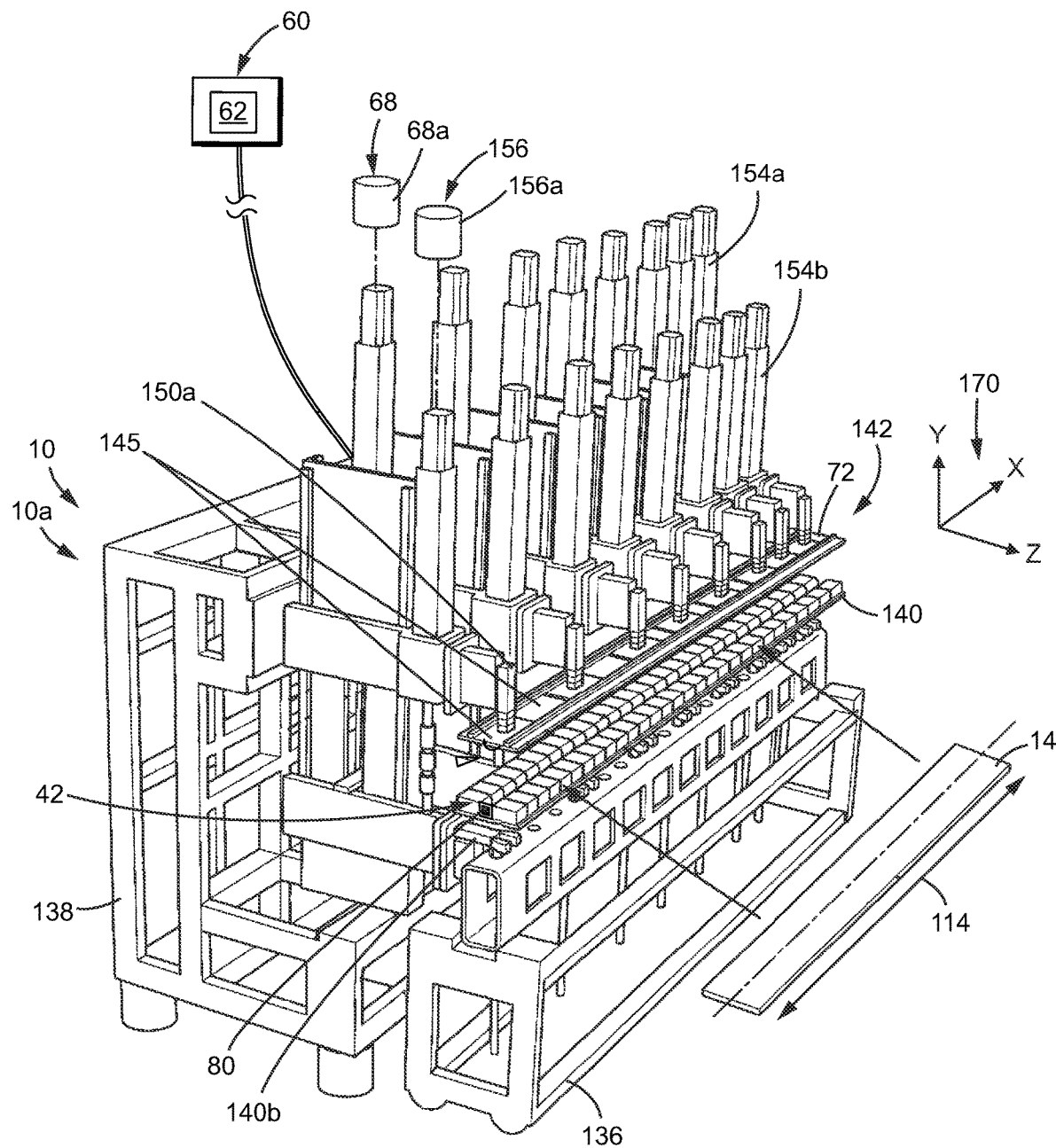
FIG. 3B is an illustration of a front perspective view of the forming apparatus of FIG. 3A, showing the portable carrier portion coupled to the forming portion, and showing the upper die and a lower die in an open position, ready to receive a composite charge.

Now referring to FIGS. 3A-3B, FIG. 3A is an illustration of a front perspective view of an exemplary version of a forming apparatus 10, such as in the form of the overlay forming apparatus 10a, of the disclosure, for forming the high contour composite structure 18, using a version of the overlay tool assembly 42 attached to the upper die 72. FIG. 3A shows a portable carrier portion 136 uncoupled from a forming portion 138. FIG. 3B is an illustration of a front perspective view of the forming apparatus 10, such as in the form of the overlay forming apparatus 10a, of FIG. 3A, and showing the portable carrier portion 136 coupled to the forming portion 138, and showing the upper die 72 and a lower die in an open position 142, ready to receive a composite charge 14. The forming apparatus 10, such as in the form of the overlay forming apparatus 10a, comprises the upper die 72 and the lower die 140, between which the composite charge 14 is formed. During the forming process 12 (see FIG. 1), when the upper die 72 and the lower die 140 are in contact with each other, they are in a closed position.

As shown in FIG. 3A, the upper die 72 has a top side 144a and a bottom side 144b, and has upper die portions 145, such as pairs 145a of upper die portions 145, that are slidably displaceable, via first actuators 68, such as contour control actuators 68a. As shown in FIGS. 3A-3B, the upper die 72 comprises a punch 82 mounted on a flexible backing plate 146. The punch 82 is preferably mounted on a bottom portion 146a (see FIG. 3A) of the flexible backing plate 146, and projects downwardly from the bottom portion 146a of the flexible backing plate 146. The punch 82 may extend along a length 148 (see FIG. 3A) of the flexible backing plate 146. The punch 82 may be formed of any suitable rigid material, such as a metal, including steel and stainless steel, or another suitable metal, a ceramic, a composite, or another suitably rigid material. The flexible backing plate 146 may comprise, for example and without limitation, relatively thin aluminum or other similar metals or flexible synthetic materials.

The flexible backing plate 146 is mounted on first anvils 150a (see FIG. 3A) for sliding movement along the x-axis by the upper die portions 145, which may be in the form of a series of side plates 152 (see FIG. 3A). FIG. 3A further shows first vertical supports 154a displaceable along the y-axis by the first actuators 68, such as the contour control actuators 68a, and shows second vertical supports 154b displaceable along the y-axis by second actuators 156, such as shape forming actuators 156a. FIG. 3A further shows the first anvils 150a secured to first slide arms 158a with first brackets 160a, and shows second anvils 150b secured to second slide arms 158b with second brackets 160b.

In one version of the overlay tool assembly 42, such as in the form of the scalloped shim overlay tool assembly 42a, used with the forming apparatus 10, such as the overlay forming apparatus 10a, of FIG. 3A, the overlay tool assembly 42 has overlay sections 76 (see FIG. 1), such as scalloped sections 76a (see FIG. 1) that are laid over, or attached to, the bottom side 144b of the upper die 72, and positioned alongside sides 84 of the punch 82, along the length 78 (see FIG. 1) of the upper die 72. In this version, the overlay tool assembly 42, such as in the form of the scalloped shim overlay tool assembly 42a, comprises a partial overlay tool assembly 42c (see FIG. 5B), in that it is partially overlaid over the bottom side 144b of the upper die 72 but is not overlaid over the punch 82.

As discussed above, the overlay tool assembly 42, such as in the form of the scalloped shim overlay tool assembly 42a, may further comprise the shape conversion element 85 (see FIG. 1) that may be overlaid over the punch 82, and attached to the punch 82, or attached to one or more of the overlay sections 76, or attached to another portion of the upper die 72, via one or more attachment elements, such as screws, bolts, clips, clamps, or other suitable attachment elements. The shape conversion element 85 has a shape conversion element shape 86 (see FIG. 1) that is different than the punch shape 88 (see FIG. 5B) of the punch 82 and allows for forming the composite charge 14 into different shapes than an existing punch 82 on the forming apparatus 10, such as the overlay forming apparatus 10a. With the combination of the overlay sections 76, such as the scalloped sections 76a, and the shape conversion element 85, the overlay tool assembly 42, such as in the form of the scalloped shim overlay tool assembly 42a, comprises a full overlay tool assembly 42b, in that it is fully overlaid over the bottom side 144b of the upper die 72, including overlaid over the punch 82.

In another version, as discussed above, the overlay tool assembly 42, such as in the form of the scalloped shim overlay tool assembly 42a, comprises the overlay sections 76, such as the scalloped sections 76a, and the punch element 80, and comprises a full overlay tool assembly 42b (see FIG. 5A), in that it is fully overlaid over the bottom side 144b of the upper die 72, and the punch element 80 takes the place of, and functions similarly to the punch 82. The punch element 80 may be attached to the overlay sections 76, such as the scalloped sections 76a, to form the overlay tool assembly 42, such as in the form of the scalloped shim overlay tool assembly 42a. Alternatively, the punch element 80 and the overlay sections 76, such as the scalloped sections 76a, may be formed as a unitary, continuous, and monolithic unit to form the overlay tool assembly 42, such as in the form of the scalloped shim overlay tool assembly 42a.

As shown in FIG. 3A, the lower die 140 is supported on a flexible die tray 162 mounted on the portable carrier portion 136 that is releasably coupled to the first anvils 150a by means of a releasable coupling 164. The lower die 140 comprises die blocks 165, such as pairs 165a of die blocks 165, spaced apart to define a die cavity 166 (see FIGS. 3A-3B), and slidably displaceable, via second actuators 156, such as shape forming actuators 156a.

The punch 82 is designed for at least partial insertion into the die cavity 166, during the forming process 12. Alternatively, the punch element 80 of the overlay tool assembly 42, such as the scalloped shim overlay tool assembly 42a, is designed for at least partial insertion into the die cavity 166, during the forming process 12.

The die blocks 165 are individually displaceable relative to each other and form a changeable die contour. The die blocks 165 are mounted on the flexible die tray 162, which is formed of any suitable flexible material, such as thin aluminum, or a synthetic or plastic material. The die blocks 165 are preferably aligned in a side-by-side relationship along a length 168 (see FIG. 3A) of the lower die 140 and along the length of the flexible die tray 162, and may be interconnected by connectors. The die blocks 165 may comprise any suitable, relatively rigid material, such as a metal, including steel or stainless steel, a ceramic, or another suitable relatively rigid material. The die blocks 165 generally have a rectangular cross-sectional profile. However, the die blocks 165 may have other suitable cross-sectional profile shapes.

The forming apparatus 10, such as in the form of the overlay forming apparatus 10a, further comprises a plurality of load cells 66 (see FIG. 1) coupled to the first actuators 68, such as the contour control actuators 68a, to monitor pressure 46 (see FIG. 1) applied to the composite charge 14 (see FIG. 3B) by the first actuators 68, such as the contour control actuators 68a, and the second actuators 156, such as the shape forming actuators 156a. The forming apparatus 10, such as in the form of the overlay forming apparatus 10a, further comprises the control system 60 (see FIGS. 3A-3B) having the controller 62 (see FIGS. 3A-3B) to operably control the first actuators 68 and the second actuators 156.

The first actuators 68, such as the contour control actuators 68a (see FIGS. 3A-3B), control the displacement of the first anvils 150a (see FIG. 3A), and control the independent displacement of the die blocks 165 of the lower die 140 along its length 168 (see FIG. 3A). The second actuators 156, such as the shape forming actuators 156a (see FIGS. 3A-3B), control displacement of the second anvils 150b (see FIG. 3A), and independently control the displacement of upper die portions 145 (see FIGS. 3A-3B) of the upper die 72, such as pairs 145a (see FIG. 3B) of the upper die portions 145. The first actuators 68, such as the contour control actuators 68a, and the second actuators 156, such as the shape forming actuators 156a, are controlled by the controller 62 (see FIGS. 1, 3A-3B) of the control system 60 (see FIGS. 1, 2A-2B) which uses operator input controls, a control program, such as an algorithm or a software program, and contour data of the high contour composite structure 8, to be formed, to control the operation of the first actuators 68, such as the contour control actuators 68a, and the second actuators 156, such as the shape forming actuators 156a. Through the operation of the controller 62, the die blocks 165 may be individually displaced to collectively form the changeable die contour corresponding to the high contour composite structure 18, to be formed. In addition, through operation of the controller 62, the upper die portions 145 are individually displaced sequentially to form the composite charge 14 (see FIG. 3B) against the lower die 140 in a manner that applies downward compressive force against portions of the composite charge 14 throughout the forming process 12, when the upper die 72 is closed against the lower die 140, and the overlay tool assembly 42 is coupled to the upper die 72.

As further shown in FIGS. 3A-3B, in this exemplary version, the forming apparatus 10, such as the overlay forming apparatus 10a, employs an orthogonal x, y, z coordinate system in which the x-axis corresponds to the longitudinal direction of the composite charge 14, and the formed contour extends along a y-axis.

In this exemplary version of the forming apparatus 10, such as in the form of the overlay forming apparatus 10a, the overlay tool assembly 42 coupled to the upper die 72 has the overlay sections 76, such as the scalloped sections 76a, positioned between pairs 66a of the plurality of load cells 66 along a length 78 (see FIG. 1) of the upper die 72, and positioned against one or more portions 14a of the composite charge 14 during a forming process 12. The composite charge 14 has ply discontinuity features 90 (see FIG. 1) formed through the one or more portions 14a and aligned with the scalloped sections 76a. The overlay tool assembly 42, such as the scalloped shim overlay tool assembly 42a, denies pressure 46 (see FIG. 1) and a through thickness compaction 48 (see FIG. 1) to the one or more portions 14a of the composite charge 14 during the forming process 12, to allow one or more plies 32 (see FIG. 1) in the one or more portions 14a of the composite charge 14 formed into one or more portions 18a (see FIG. 1) of the high contour composite structure 18, to move or slip after the forming process 12, and to enable in-plane bending 52, or in-plane steering 52a, of the high contour composite structure 18, formed by the composite charge 14, in one or more post-forming operations 56.

After the forming process 12 is complete, the portable carrier portion 136 may be used to transport the lower die 140 supporting the high contour composite structure 18, that is formed, for one or more post-forming operations 56, for example, steering or moving the high contour composite structure 18 to the tool 58 (see FIGS. 3C-3D), such as the net shape tool 58a (see FIGS. 3C-3D), for example, a cure tooling, or onto a substrate, for example, an uncured skin. The high contour composite structure 18 may also be transported or transferred with another suitable apparatus, to another suitable device or structure for additional post-forming operations 56, such as further bending, processing, or assembly.

Now referring to FIG. 3C, FIG. 3C is an illustration of a front perspective view of an exemplary version of a tool 58, such as a net shape tool 58a, in the form of a male tool 58b. The tool 58, such as the net shape tool 58a, in the form of the male tool 58b, may be used in a post-forming operation 56 (see FIG. 1), such as bending or manipulating the high contour composite structure 18 (see FIG. 1) on the male tool 58b, after it is removed from the forming apparatus 10 (see FIG. 1). Alternatively, the post-forming operation 56 may comprise bending or manipulating the high contour composite structure 18 on the forming apparatus 10, or bending or manipulating the high contour composite structure 18, after the high contour composite structure 18 is removed from the forming apparatus 10, and before placing the high contour composite structure 18 on the male tool 58b, e.g., bending or manipulating the high contour composite structure 18 in mid-air above the male tool 58b, after it is removed from the forming apparatus 10, or bending or manipulating the high contour composite structure 18 at another location after removal from the forming apparatus 10 and before placement on the male tool 58b. FIG. 3C further shows an orthogonal x, y, z coordinate system 170a, in which the x-axis corresponds to a longitudinal direction of the high contour composite structure 18 (see FIG. 1), and the formed contour extends along a y-axis.

Now referring to FIG. 3D, FIG. 3D is an illustration of a front perspective view of an exemplary version of a tool 58, such as a net shape tool 58a, in the form of a female tool 58c. The tool 58, such as the net shape tool 58a, in the form of the female tool 58c, may be used in the post-forming operation 56 (see FIG. 1), such as bending or manipulating the high contour composite structure 18 (see FIG. 1) on the female tool 58c, after it is removed from the forming apparatus 10 (see FIG. 1). Alternatively, the post-forming operation 56 may comprise bending or manipulating the high contour composite structure 18 on the forming apparatus 10, or bending or manipulating the high contour composite structure 18, after the high contour composite structure 18 is removed from the forming apparatus 10, and before placing the high contour composite structure 18 on the female tool 58c, e.g., bending or manipulating the high contour composite structure 18 in mid-air above the female tool 58c, after it is removed from the forming apparatus 10, or bending or manipulating the high contour composite structure 18 at another location, after removal from the forming apparatus 10 and before placement on the female tool 58c. FIG. 3D further shows an orthogonal x, y, z coordinate system 170a, in which the x-axis corresponds to a longitudinal direction of the high contour composite structure 18 (see FIG. 1), and the formed contour extends along a y-axis.

Figure 4A:
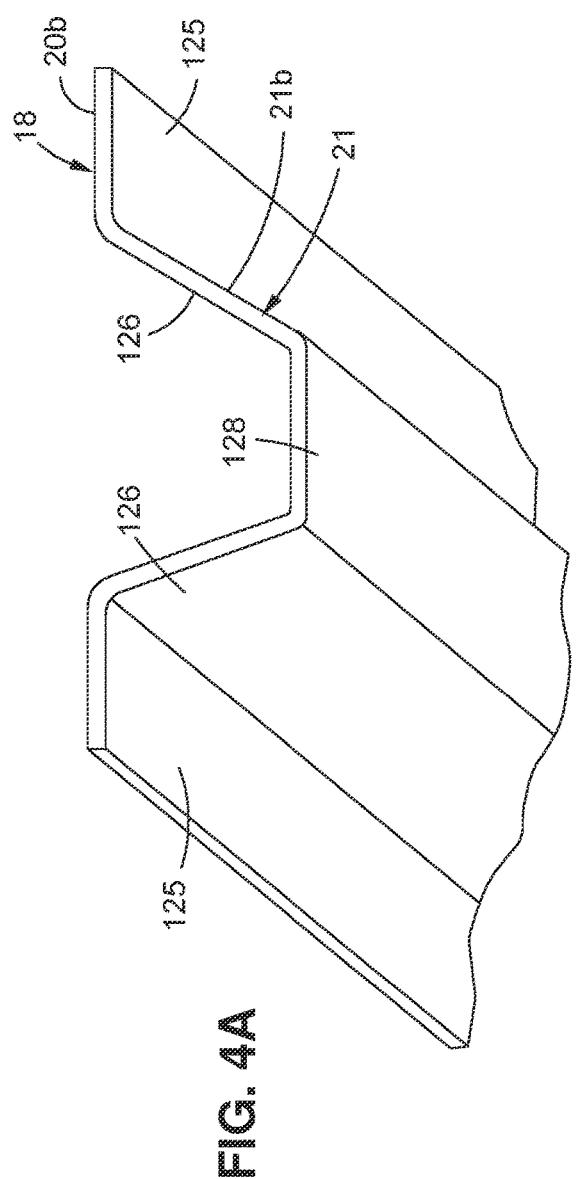
FIG. 4A is an illustration of a hat-shaped stringer that may be formed by exemplary versions of an apparatus of the disclosure.

Now referring to FIG. 4A, FIG. 4A is an illustration of a high contour composite structure 18, such as in the form of a hat-shaped stringer 20b, that may be formed by exemplary versions of the forming apparatus 10 (see FIG. 1) of the disclosure. As shown in FIG. 4A, the hat-shaped stringer 20b has a cross-section 21, in the form of a hat-shaped cross-section 21b. As further shown in FIG. 4A, the hat-shaped stringer 20b includes flanges 125, webs 126, or sides, and a cap 128.

Figure 4D:
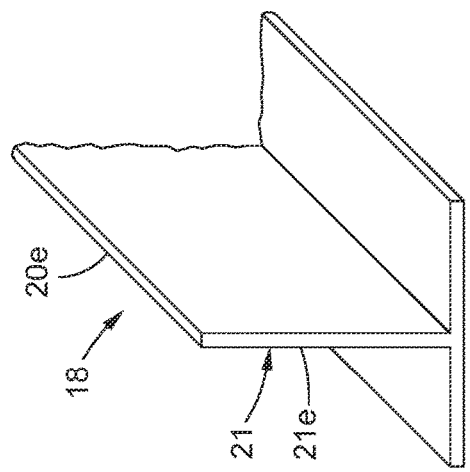
FIG. 4D is an illustration of a T-shaped stringer that may be formed by exemplary versions of an apparatus of the disclosure.
Figure 4C:
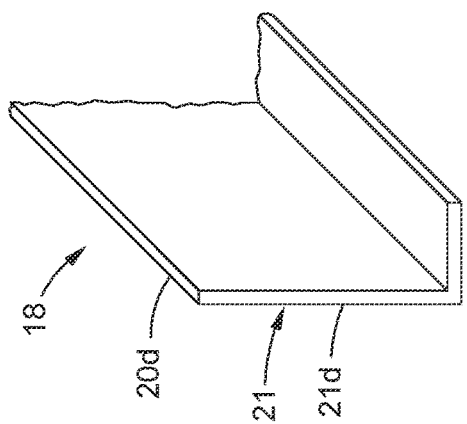
FIG. 4C is an illustration of an L-shaped stringer that may be formed by exemplary versions of an apparatus of the disclosure.
Figure 4B:
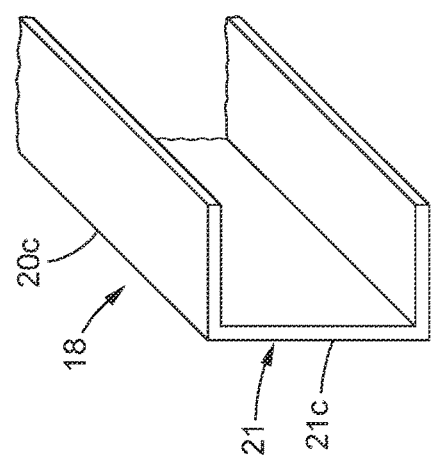
FIG. 4B is an illustration of a C-shaped stringer that may be formed by exemplary versions of an apparatus of the disclosure.

Now referring to FIG. 4B, FIG. 4B is an illustration of a high contour composite structure 18, such as in the form of a C-shaped stringer 20c, that may be formed by exemplary versions of the forming apparatus 10 (see FIG. 1) of the disclosure. As shown in FIG. 4B, the C-shaped stringer 20c has a cross-section 21, in the form of a C-shaped cross-section 21c.

Now referring to FIG. 4C, FIG. 4C is an illustration of a high contour composite structure 18, such as in the form of an L-shaped stringer 20d, that may be formed by exemplary versions of the forming apparatus 10 (see FIG. 1) of the disclosure. As shown in FIG. 4C, the L-shaped stringer 20d has a cross-section 21, in the form of an L-shaped cross-section 21d.

Now referring to FIG. 4D, FIG. 4D is an illustration of a high contour composite structure 18, such as in the form of a T-shaped stringer 20e, that may be formed by exemplary versions of the forming apparatus 10 (see FIG. 1) of the disclosure. As shown in FIG. 4D, the T-shaped stringer 20e has a cross-section 21, in the form of a T-shaped cross-section 21e.

Figure 14:
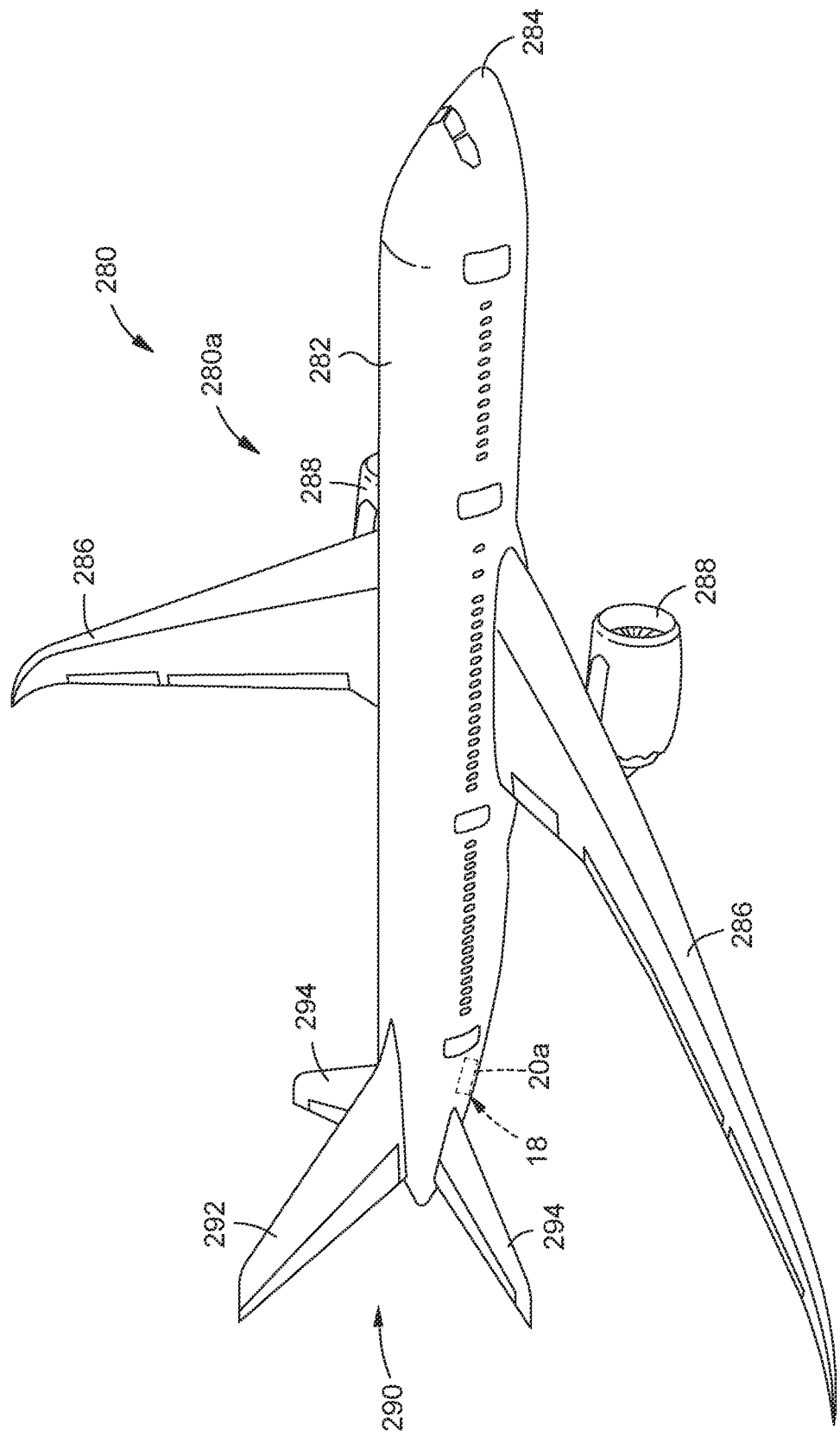
FIG. 14 is an illustration of a perspective view of an aircraft incorporating a high contour composite structure made with an exemplary version of a forming apparatus and a method of the disclosure.

One or more of the high contour composite structures 18 shown in FIGS. 4A-4D may be used, for example and without limitation, in the aircraft industry to stiffen or support a variety of structures that have a bending form, for example, the nose 284 (see FIG. 14) and tail 290 (see FIG. 14) sections of a fuselage 282 (see FIG. 14). In addition to the shapes and cross-sections of the high contour composite structures 18 shown in FIGS. 4A-4D, the high contour composite structure 18 may also have another suitable cross-sectional profile, such as a rounded cap, a square, or another geometric or angled shape.

Now referring to FIG. 5A, FIG. 5A is an illustration of an enlarged front perspective view of an exemplary version of a forming apparatus 10, such as in the form of the overlay forming apparatus 10a, of the disclosure having a version of the overlay tool assembly 42, such as the scalloped shim overlay tool assembly 42a, attached to the bottom side 144b of the upper die 72. FIG. 5A shows the upper die 72 and the lower die 140 in an open position 142 opposite each other. In one exemplary version, FIG. 5A shows three (3) overlay tool assemblies 42, such as in the form of scalloped shim overlay tool assemblies 42a, each having a hat-shaped cross-section 21b, with portions shaped in the form of flanges 125, webs 126, or sides, and a cap 128. Each overlay tool assembly 42, such as the scalloped shim overlay tool assembly 42a, is attached, via attachment elements 172 (see FIG. 5A), such as in the form of adhesive tape 172a, to the bottom side 144b of the upper die 72. The attachment elements 172 may also comprise screws, bolts, clamps, or other suitable attachment elements. Each overlay tool assembly 42, such as the scalloped shim overlay tool assembly 42a, comprises a hard tool 74 (see FIG. 5A) that is either formed as a unitary or monolithic structure, or as separate components assembled together, and is coupled or attached to the upper die 72.

As shown in FIG. 5A, each overlay tool assembly 42, such as the scalloped shim overlay tool assembly 42a, comprises overlay sections 76, such as scalloped sections 76a, and a punch element 80. During the forming process 12, the overlay sections 76, such as the scalloped sections 76a are configured to be overlaid over flange areas 174 of the composite charge 14. In this exemplary version, each overlay tool assembly 42, such as the scalloped shim overlay tool assembly 42a, is a full overlay tool assembly 42b that includes the punch element 80, where the existing punch 82 has been removed or not included, and is designed to attach to and cover all, or a portion of, the bottom side 144b of the upper die 72, along the length 78 (see FIG. 1) of the upper die 72.

Figure 5B:
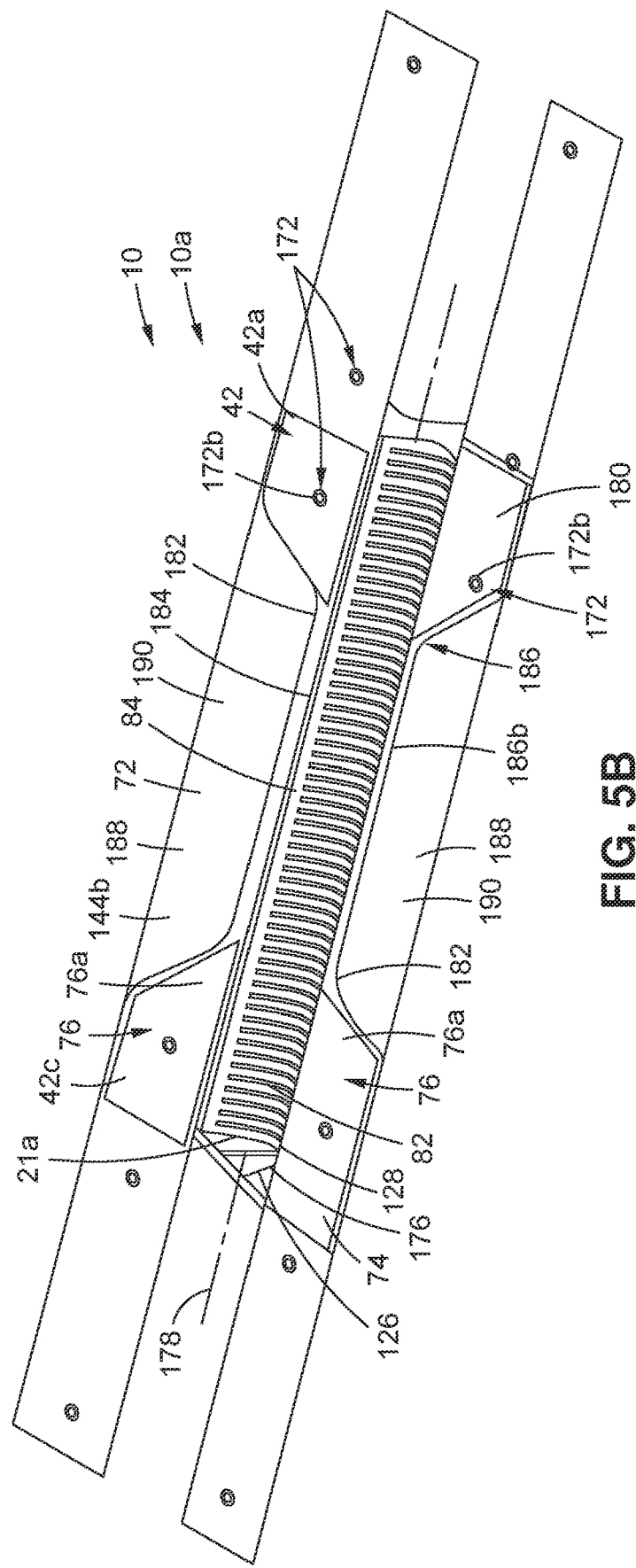
FIG. 5B is an illustration of an enlarged perspective right side view of another version of an overlay tool assembly attached to an upper die.

Now referring to FIG. 5B, FIG. 5B is an illustration of an enlarged perspective right side view of another version of the overlay tool assembly 42, such as the scalloped shim overlay tool assembly 42a, comprising a partial overlay tool assembly 42c, that is attached to a portion, or part, of the bottom side 144b of the upper die 72. FIG. 5B is representative of a portion 175 of the length 78 (see FIG. 1) of the upper die 72 and a portion of the entire length of the forming apparatus 10, such as the overlay forming apparatus 10a.

As further shown in FIG. 5B, overlay sections 76, such as scalloped sections 76a, are attached adjacent to sides 84 of the punch 82. In this version, the punch 82 exists and is present on the upper die 72 of the forming apparatus 10, such as the overlay forming apparatus 10a, and the overlay tool assembly 42, such as the scalloped shim overlay tool assembly 42a, is retrofitted around, or adjacent to, the existing punch 82.

FIG. 5B shows the overlay sections 76, such as scalloped sections 76a, of the overlay tool assembly 42, such as the scalloped shim overlay tool assembly 42a, attached to the upper die 72, via attachment elements 172, such as screws 172b. The attachment elements 172 may also comprise adhesive tape, bolts, clamps, or other suitable attachment elements. As shown in FIG. 5B, the overlay tool assembly 42, such as the scalloped shim overlay tool assembly 42a, comprises a hard tool 74 (see FIG. 5B) that is formed in separate parts and attached to the upper die 72.

As further shown in FIG. 5B, the punch 82 has a rounded hat shape 176 with a rounded hat cross-section 21a, and has a central axis 178 through the center of the punch 82. If another shape for the punch 82 is desired, a shape conversion element 85 (see FIG. 1) may be overlaid over the cap 128 and the webs 126 of the punch 82, and attached to the punch 82, or attached to one or more of the overlay sections 76, such as the scalloped sections 76a, or attached to another portion of the upper die 72, via one or more attachment elements 172. The shape conversion element 85 chosen preferably has a shape conversion element shape 86 (see FIG. 1) that is different than the rounded hat shape 176 of the punch 82, shown in FIG. 5B, in order to change the shape of the high contour composite structure 18 to be formed in the forming apparatus 10, such as the overlay forming apparatus 10a. For example, the shape conversion element 85 may have a hat-shaped cross-section 21b (see FIG. 4A), a C-shaped cross-section 21c (see FIG. 4B), an L-shaped cross-section 21d (see FIG. 4C), a T-shaped cross-section 21e (see FIG. 4D), or another suitable cross-section shape. The conversion of the punch 82 to another desired shape, using the shape conversion element 85 is preferably for an entire length 78 (see FIG. 1) of the upper die 72.

As further shown in FIG. 5B, each overlay section 76, such as the scalloped section 76a, may be in the form of a structural shim 180 comprising one or more curved sides 182, or edges, and one or more straight sides 184, or edges. The curved side 182, or edge, has a curved shape 186 (see FIGS. 5B, 5C). In one version, the curved shape 186 may be in the form of a scalloped shape 186a (see FIG. 5C), or wave shape, or semi-circular shape. In another version, the curved shape 186 may be in the form of a curved trapezoidal shape 186b (see FIG. 5B). The curved shape 186 may also be in the form of another suitable curved shape. As shown in FIG. 5B, the curved side 182 with the curved shape 186 creates, or forms, a non-overlaid area 188, which is an area that is not overlaid or covered by the overlay tool assembly 42, such as the scalloped shim overlay tool assembly 42a. As shown in FIG. 5B, the non-overlaid areas 188 are aligned with locations 190196c on the upper die 72 that correspond to one or more portions 14a, such as one or more flange areas 174, on the composite charge 14 to be formed into the high contour composite structure 18 (see FIG. 1), when the composite charge 14 is positioned and formed between the upper die 72 and the lower die 140 (see FIG. 3A) during the forming process 12. As further shown in FIG. 5B, the straight sides 184 of the overlay sections 76, such as the scalloped sections 76a, are aligned with, and adjacent to, the sides 84 of the punch 82.

Now referring to FIG. 5C, FIG. 5C is an illustration of a top view of a portion 72a of the upper die 72 of a forming apparatus 10 (see FIGS. 1, 5A), such as in the form of the overlay forming apparatus 10a (see FIGS. 1, 5A), with another version of the overlay tool assembly 42, such as the scalloped shim overlay tool assembly 42a, coupled to the upper die 72, and showing the composite charge 14 with relief cuts 96. FIG. 5C shows flange areas 174, web areas 192, and a cap area 194 of the composite charge 14 to be formed with the upper die 72, and shows the punch 82. FIG. 5C shows a pressure gradient 195 along the cap area 194. The pressure gradient 195 indicates pressure zones 196 of the forming apparatus 10, such as the overlay forming apparatus 10a. As shown in FIG. 5C, the pressure zones 196 comprise high pressure zones 196a at load cell locations 197 of the load cells 66 (see FIG. 1), and a low pressure zone 196b, including a zero pressure zone 196c, between the high pressure zones 196a. The high pressure zones 196a have a high pressure in a range of 1 atmosphere of pressure to 2 atmospheres of pressure. However, the high pressure zones 196a may have a high pressure at another suitable amount. The low pressure zones 196b have a low pressure in a range of 0 atmosphere of pressure to less than 1 atmosphere of pressure. Preferably, the low pressure zones 196b, including the zero pressure zones 196c have a low pressure at 0 atmosphere of pressure.

As shown in FIG. 5C, the overlay tool assembly 42, such as the scalloped shim overlay tool assembly 42a, has overlay sections 76, such as scalloped sections 76a, each having the curved side 182, or edge, with the curved shape 186, such as the scalloped shape 186a, and the straight side 184 aligned with, or adjacent to, the side 84 of the punch 82. As shown in FIG. 5C, the curved sides 182 with the curved shapes 186 create, or form, the non-overlaid areas 188. As shown in FIG. 5C, the non-overlaid areas 188 are aligned with the portions 14a, such as the flange areas 174, on the composite charge 14 to be formed into the high contour composite structure 18 (see FIG. 1), when the composite charge 14 is positioned and formed between the upper die 72 and the lower die 140 (see FIG. 3A) during the forming process 12. As further shown in FIG. 5C, the overlay sections 76, such as the scalloped sections 76a, are positioned between the load cell locations 197 of the load cells 66, which are at the high pressure zones 196a, and the overlay sections 76, such as the scalloped sections 76a, are aligned at the low pressure zone 196b, including the zero pressure zone 196c.

The non-overlaid areas 188 of the overlay sections 76, such as the scalloped sections 76a, create the low pressure zones 196b, including the zero pressure zones 196c, at the portions 14a, such as flange areas 174, of the composite charge 14 formed into the high contour composite structure 18 (see FIG. 1), such as the stringer 20 (see FIG. 1), for example, the hat-shaped stringer 20b (see FIG. 4A), formed in the forming apparatus 10, such as in the form of the overlay forming apparatus 10a. Such low pressure zones 196b, including zero pressure zones 196c, minimize or prevent through thickness compaction 48 (see FIG. 1), or consolidation, of the plies 32 (see FIG. 1) of the portions 14a, such as the flange areas 174, of the composite charge 14 formed into the high contour composite structure 18, such as the stringer 20, for example, the hat-shaped stringer 20b.

FIG. 5C further shows the composite charge 14 having ply discontinuity features 90, such as in the form of relief cuts 96 that are cut through the plies 32 (see FIG. 1) forming the composite charge 14. The composite charge 14 may be pre-cut with the relief cuts 96 before being delivered to the forming apparatus 10. For example, the composite charge 14 may be cut with the relief cuts 96 during a lamination phase for laying up the composite charge 14, or may be cut before or after the lamination phase. Preferably, the forming apparatus 10 does not cut the composite charge 14 with the relief cuts 96. As shown in FIG. 5C, the relief cuts 96 are cut into the flange areas 174 of the composite charge 14. When the composite charge 14 is positioned in the forming apparatus 10, such as the overlay forming apparatus 10a, the locations of the relief cuts 96 are aligned with locations of the non-overlaid areas 188 of the overlay sections 76, such as the scalloped sections 76a. The locations of the relief cuts 96 and the locations of the non-overlaid areas 188 of the overlay sections 76, such as the scalloped sections 76a, are both positioned between pairs 66a (see FIG. 1) of load cells 66 (see FIG. 1) of the forming apparatus 10, such as the overlay forming apparatus 10a.

The overlay sections 76, such as the scalloped sections 76a, are aligned with the low pressure zone 196b, including the zero pressure zone 196c, and are aligned with the ply discontinuity features 90, or fiber break features, of the plies 32 that are cut through the thickness 15 (see FIG. 1) of the portions 14a of the composite charge 14. This denies through thickness compaction 48 (see FIG. 1) of the prepreg material 35 (see FIG. 1) of the plies 32 (see FIG. 1), to remove ply-to-ply adhesion, and to allow the relief cuts 96 to slip or slide with respect to one another in one or more post-forming operations 56. The forming apparatus 10, such as in the form of the overlay forming apparatus 10a, with the overlay tool assembly 42, such as the scalloped shim overlay tool assembly 42a, allows for an alignment of the non-overlaid areas 188 of the overlay sections 76, such as the scalloped sections 76a, and the relief cuts 96, to drive reduction of through thickness compaction 48, and in-plane compaction and consolidation above slip planes 200 (see FIG. 6), and allows the slip planes 200 to work or move in post-forming operations 56 (see FIG. 1), or activities. The forming apparatus 10, such as in the form of the overlay forming apparatus 10a, with the overlay tool assembly 42, such as the scalloped shim overlay tool assembly 42a, is designed to exploit the soft areas with the low pressure zone 196b, including the zero pressure zone 196c, between the high pressure zones 196a of the load cells 66 of the forming apparatus 10.

Now referring to FIG. 5D, FIG. 5D is an illustration of a schematic diagram showing the pressure gradient 195 with the pressure zones 196, comprising the high pressure zones 196a, and the low pressure zones 196b, including the zero pressure zones 196c, on the overlay tool assembly 42, such as the scalloped shim overlay tool assembly 42a, of FIG. 5C.

As shown in FIG. 5D, at the load cell locations 197 of the load cells 66, the high pressure zones 196a have a pressure 46 (see FIG. 1) that is high and a force 202 that is large, e.g., 4000 pounds of force, applied by the contour control actuators 68a (see FIG. 3A) against the composite charge 14. Between the high pressure zones 196a at the load cell locations 197 of the load cells 66 is the low pressure zone 196b, including the zero pressure zone 196c. The low pressure zone 196b, including the zero pressure zone 196c, is the area where the flange areas 174, and in certain versions, where parts of the web areas 192, of the composite charge 14 are not compacted or consolidated during forming with the forming apparatus 10, such as in the form of the overlay forming apparatus 10a.

Figure 5F:
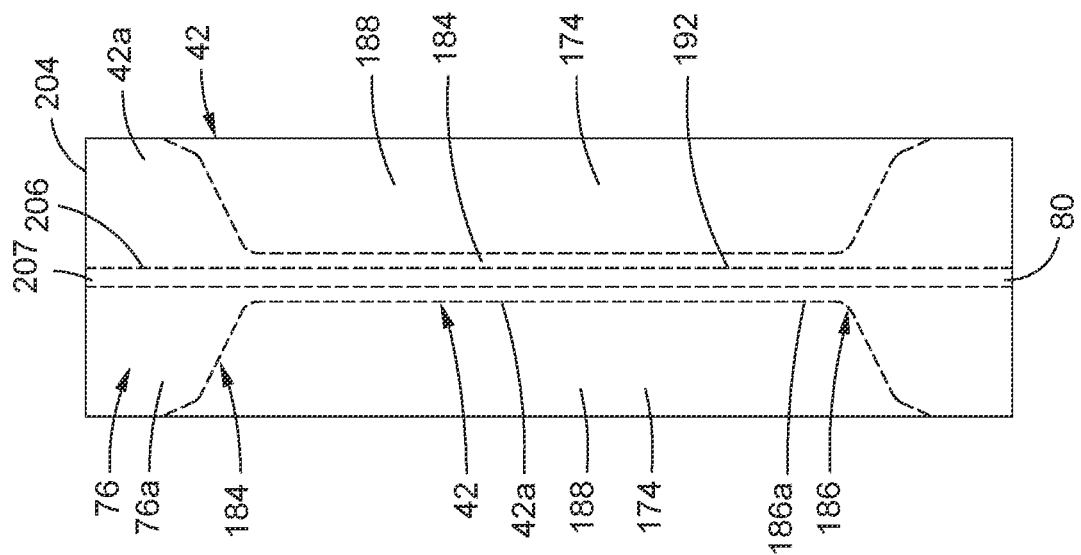
FIG. 5F is an illustration of a top view of the overlay tool assembly of FIG. 5E.
Figure 5E:
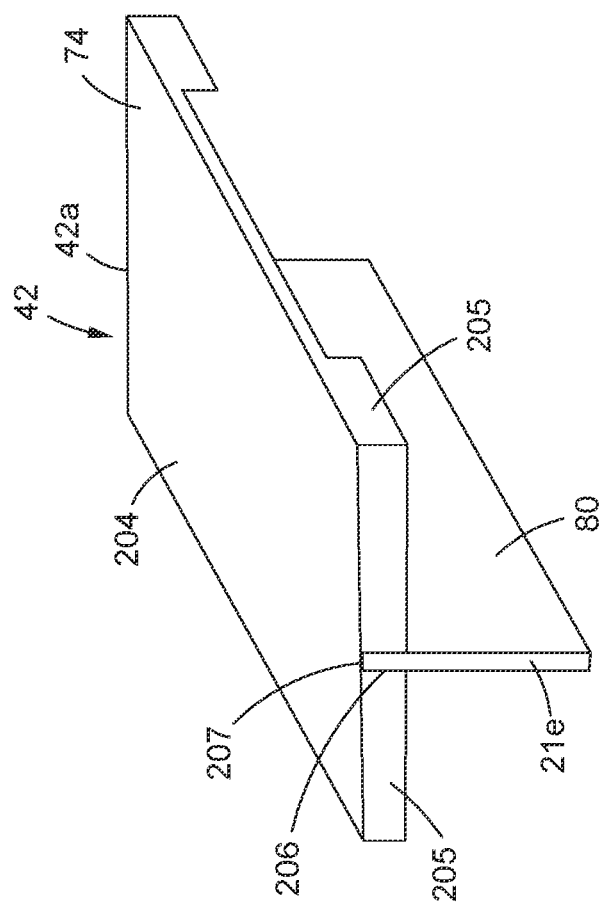
FIG. 5E is an illustration of a front perspective view of another exemplary version of an overlay tool assembly.

Now referring to FIG. 5E, FIG. 5E is an illustration of a front perspective view of another exemplary version of the overlay tool assembly 42, such as the scalloped shim overlay tool assembly 42a, that may be used with the forming apparatus 10 (see FIG. 1), such as the overlay forming apparatus 10a (see FIG. 1). As shown in the exemplary version of FIG. 5E, the overlay tool assembly 42, such as the scalloped shim overlay tool assembly 42a, has a T-shaped cross-section 21e, configured to form a T-shaped stringer 20e (see FIG. 4D), also referred to as a blade stringer. The overlay tool assembly 42, such as the scalloped shim overlay tool assembly 42a, comprises a hard tool 74 (see FIG. 5E) that is formed and configured for attachment to the upper die 72 (see FIG. 5A). In this version, as shown in FIG. 5E, the overlay tool assembly 42, such as the scalloped shim overlay tool assembly 42a, comprises a top portion 204 coupled, or attached to, a punch element 80. As shown in FIG. 5E, the top portion 204 has side edges 205 that extend downwardly and has a central slot portion 206 formed in the top portion 204. The central slot portion 206 is configured to receive, and receives, a top end 207 (see FIG. 5E) of the punch element 80. The top portion 204 is configured for attachment to the bottom side 144b (see FIG. 5A) of the upper die 72 (see FIG. 5A). The top portion 204 may be controlled automatically similar to a stringer line.

Now referring to FIG. 5F, FIG. 5F is an illustration of a top view of the overlay tool assembly 42, such as in the form of the scalloped shim overlay tool assembly 42a, having the T-shaped cross-section 21f, of FIG. 5E. FIG. 5F shows the top portion 204 and the central slot portion 206 with the top end 207 of the punch element 80 coupled in the central slot portion 206. FIG. 5F further shows the overlay sections 76, such as the scalloped sections 76a, with the curved sides 182 having the curved shape 186, such as the scalloped shape 186a, and with the straight sides 184 adjacent the web areas 192 (see also FIG. 5E). FIG. 5F further shows the non-overlaid areas 188 configured for alignment with flange areas 174 and web areas 192 to be formed with the composite charge 14. Ply discontinuity features 90 (see FIG. 5C), such as relief cuts 96 (see FIG. 5C), splices 92 (see FIG. 1), or discontinuous fibers, may be introduced into the flange areas 174 in a composite charge 14 and aligned with the non-overlaid areas 188.

Figure 6:
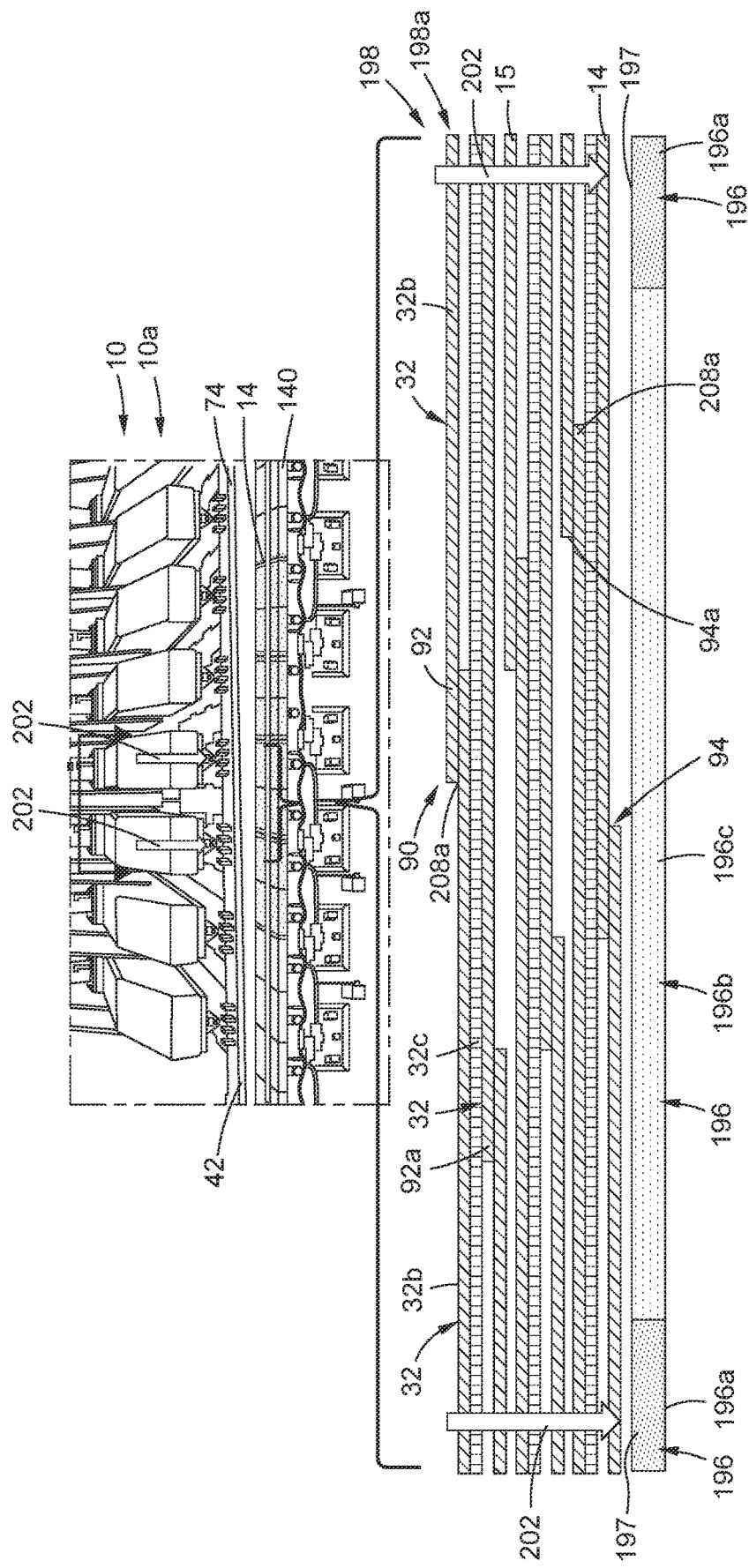
FIG. 6 is an illustration of a right side perspective view of an exemplary version of a forming apparatus of the disclosure, and showing an enlarged cross-sectional view of an exemplary version of a ply layup portion of a composite charge having a partial splice.

Now referring to FIG. 6, FIG. 6 is an illustration of a right side perspective view of an exemplary version of a forming apparatus 10, such as in the form of the overlay forming apparatus 10a, of the disclosure, and showing an enlarged cross-sectional view of an exemplary version of a ply layup portion 198a of a ply layup 198 of a composite charge 14 having ply discontinuity features 90, such as splices 92, or overlaps, in the form of a partial splice 92a with a splice pattern 94, such as a partial splice pattern 94a. FIG. 6 shows the composite charge 14 positioned between the upper die 72, with a version of the overlay tool assembly 42 attached to the upper die 72, and the lower die 140. FIG. 6 shows pressure zones 196 of the ply layup portion 198a through the thickness 15 of the composite charge 14, including high pressure zones 196a at the load cell locations 197 of the load cells 66, and the low pressure zone 196b, including the zero pressure zone 196c. FIG. 6 further shows the force 202 of the load cells 66 at the high pressure zones 196a.

As shown in FIG. 6, the ply layup portion 198a shows sets of two plies 32, such as in the form of plain weave plies 32b, having ply discontinuity features 90, such as splices 92, or overlaps. FIG. 6 further shows plies 32, such as in the form of plain cross-weave plies 32c, where one plain cross-weave ply 32c is positioned in between two plain weave plies 32b through the stack-up of the ply layup portion 198a. The ply discontinuity features 90, such as splices 92, or overlaps, are in the form of the partial splice 92a having the splice pattern 94, such as the partial splice pattern 94a, where the splices 92, or overlaps, occur partially at splice locations 208a, or overlap locations, throughout the ply layup portion 198a, as opposed to fully throughout the ply layup portion 198a.

Figure 7:
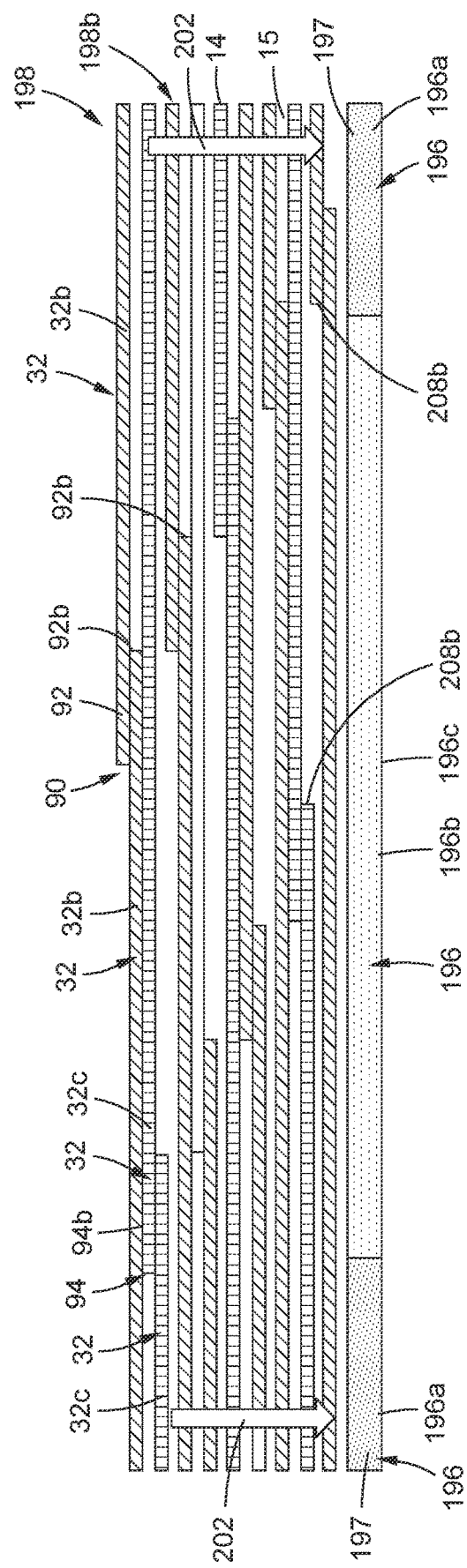
FIG. 7 is an illustration of a diagram showing an enlarged cross-sectional view of another exemplary version of a ply layup portion of a composite charge having a full zig-zag splice.

Now referring to FIG. 7, FIG. 7 is an illustration of a diagram showing an enlarged cross-sectional view of another exemplary version of a ply layup portion 198b of a ply layup 198 of a composite charge 14 having ply discontinuity features 90, such as splices 92, or overlaps, in the form of a full zig-zag splice 92b with a splice pattern 94, such as a full zig-zag splice pattern 94b. FIG. 7 shows pressure zones 196 of the ply layup portion 198b through the thickness 15 of the composite charge 14, including high pressure zones 196a at the load cell locations 197 of the load cells 66, and the low pressure zone 196b, including the zero pressure zone 196c. FIG. 7 further shows the force 202 of the load cells 66 at the high pressure zones 196a.

As shown in FIG. 7, the ply layup portion 198b shows sets of two plies 32, such as in the form of plain weave plies 32b, having ply discontinuity features 90, such as splices 92, or overlaps. FIG. 7 further shows sets of two plies 32, such as in the form of plain cross-weave plies 32c, having ply discontinuity features 90, such as splices 92, or overlaps. The two plain weave plies 32b with the splice 92 alternate with the two plain cross-weave plies 32c with the splice 92 through the stack-up of the ply layup portion 198b. The ply discontinuity features 90, such as splices 92, or overlaps, are in the form of the full zig-zag splice 92b with the splice pattern 94, such as the full zig-zag splice pattern 94b, where the splices 92, or overlaps, occur fully in a zig-zap configuration at splice locations 208b, or overlap locations, throughout the ply layup portion 198b.

Figure 8:
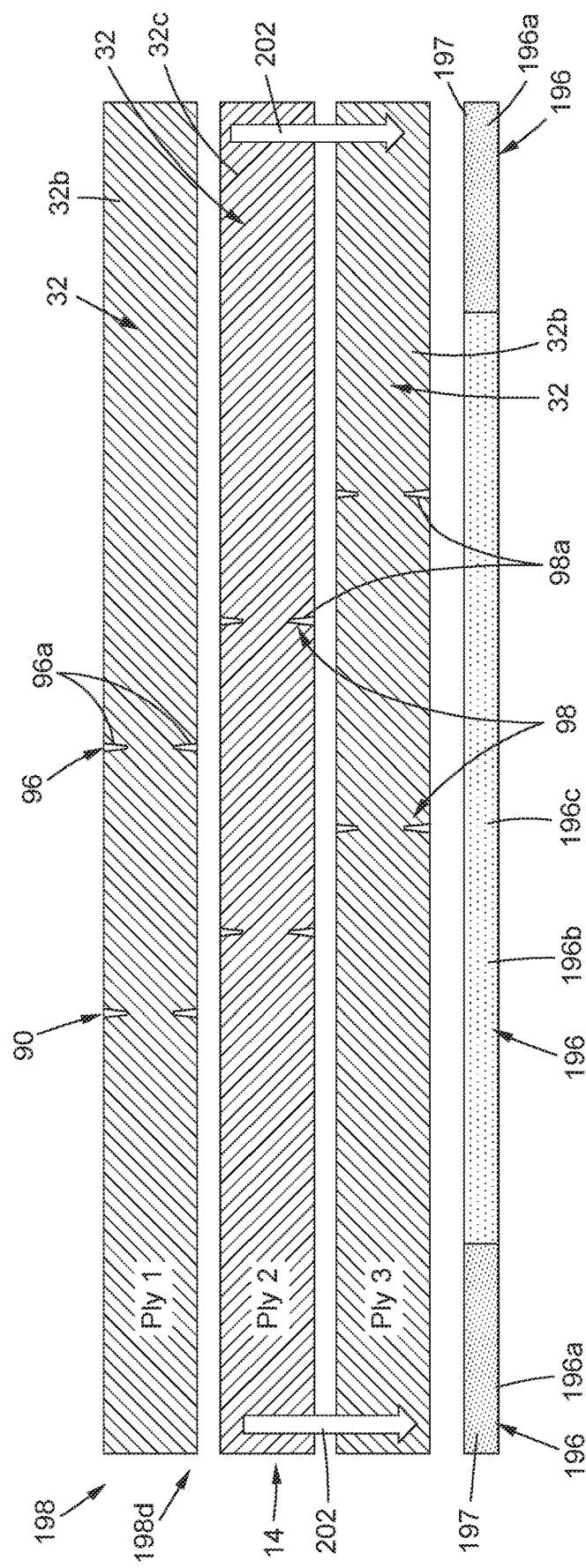
FIG. 8 is an illustration of a diagram showing an enlarged cross-sectional view of another exemplary version of a ply layup portion of a composite charge having dart-shaped relief cuts.

Now referring to FIG. 8, FIG. 8 is an illustration of a diagram showing an enlarged cross-sectional view of another exemplary version of a ply layup portion 198c of a ply layup 198 of a composite charge 14 having ply discontinuity features 90, such as relief cuts 96, in the form of dart-shaped relief cuts 96a, with a relief cut pattern 98, such as a dart-shaped relief cut pattern 98a. FIG. 8 shows pressure zones 196 of the ply layup portion 198c through the thickness 15 of the composite charge 14, including high pressure zones 196a at the load cell locations 197 of the load cells 66, and the low pressure zone 196b, including the zero pressure zone 196c. FIG. 8 further shows the force 202 of the load cells 66 at the high pressure zones 196a.

As shown in FIG. 8, the ply layup portion 198c shows plies 32, such as in the form of plain weave plies 32b, having ply discontinuity features 90, such as relief cuts 96, in the form of dart-shaped relief cuts 96a. FIG. 8 further shows a ply 32, such as in the form of a plain cross-weave ply 32c, having ply discontinuity features 90, such as relief cuts 96, in the form of dart-shaped relief cuts 96a. As shown in FIG. 8, the plain cross-weave ply 32c (Ply 2) is positioned in between two plain weave plies 32b (Ply 1 and Ply 3), in sequential layers of the plies 32, and the relief cuts 96, such as the dart-shaped relief cuts 96a, are made through the stack-up of the ply layup portion 198c. The ply discontinuity features 90, such as the relief cuts 96, in the form of the dart-shaped relief cuts 96a, occur at relief cut locations 210a, and are in the relief cut pattern 98, such as the dart-shaped relief cut pattern 98a.

Figure 9:
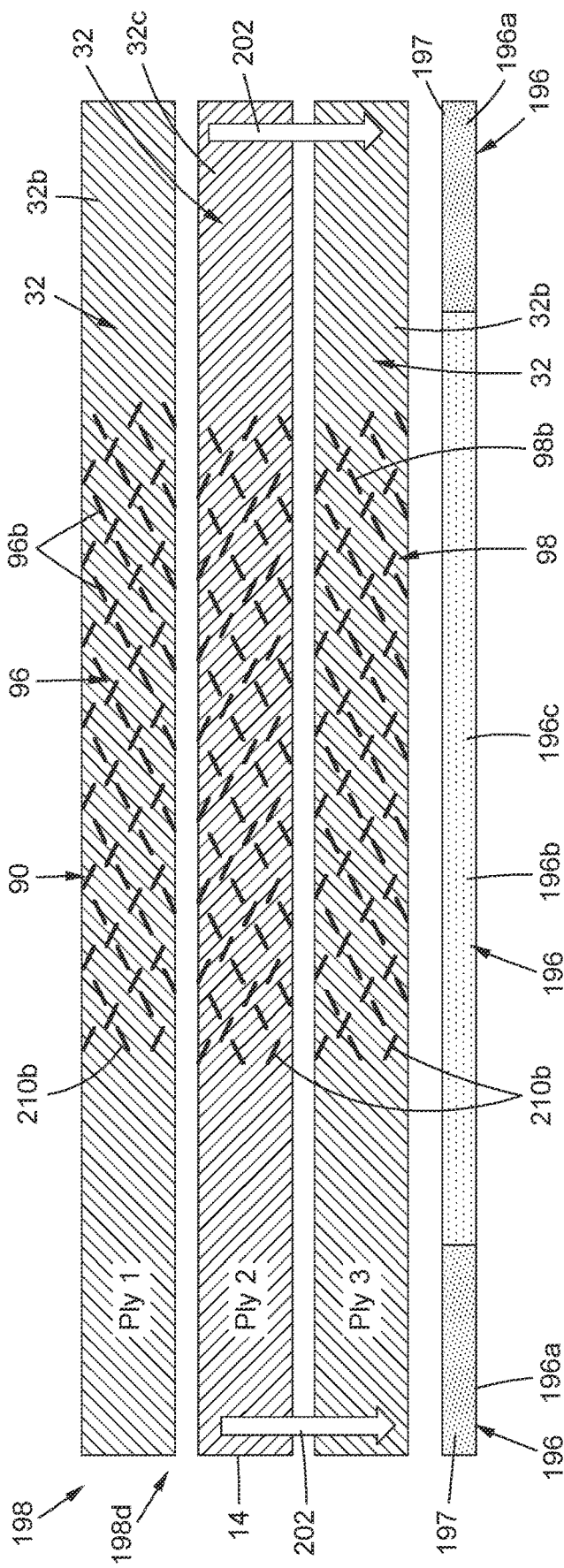
FIG. 9 is an illustration of a diagram showing an enlarged cross-sectional view of another exemplary version of a ply layup portion of a composite charge having diamond-shaped relief cuts.

Now referring to FIG. 9, FIG. 9 is an illustration of a diagram showing an enlarged cross-sectional view of another exemplary version of a ply layup portion 198d of a ply layup 198 of a composite charge 14 having ply discontinuity features 90, such as relief cuts 96, in the form of diamond-shaped relief cuts 96b with a relief cut pattern 98, such as a diamond-shaped relief cut pattern 98b. FIG. 9 shows pressure zones 196 of the ply layup portion 198d through the thickness 15 of the composite charge 14, including high pressure zones 196a at the load cell locations 197 of the load cells 66 (see FIG. 1), and the low pressure zone 196b, including the zero pressure zone 196c. FIG. 9 further shows the force 202 of the load cells 66 at the high pressure zones 196a.

As shown in FIG. 9, the ply layup portion 198d shows plies 32, such as in the form of plain weave plies 32b, having ply discontinuity features 90, such as relief cuts 96, in the form of diamond-shaped relief cuts 96b. FIG. 9 further shows a ply 32, such as in the form of a plain cross-weave ply 32c, having ply discontinuity features 90, such as relief cuts 96, in the form of diamond-shaped relief cuts 96b. As shown in FIG. 9, the plain cross-weave ply 32c (Ply 2) is positioned in between two plain weave plies 32b (Ply 1 and Ply 3), in sequential layers of the plies 32, and the relief cuts 96, such as the diamond-shaped relief cuts 96b, are made through the stack-up of the ply layup portion 198d. The ply discontinuity features 90, such as the relief cuts 96, in the form of the diamond-shaped relief cuts 96b, occur at relief cut locations 210b, and are in the relief cut pattern 98, such as the diamond-shaped relief cut pattern 98b.

Figure 12:
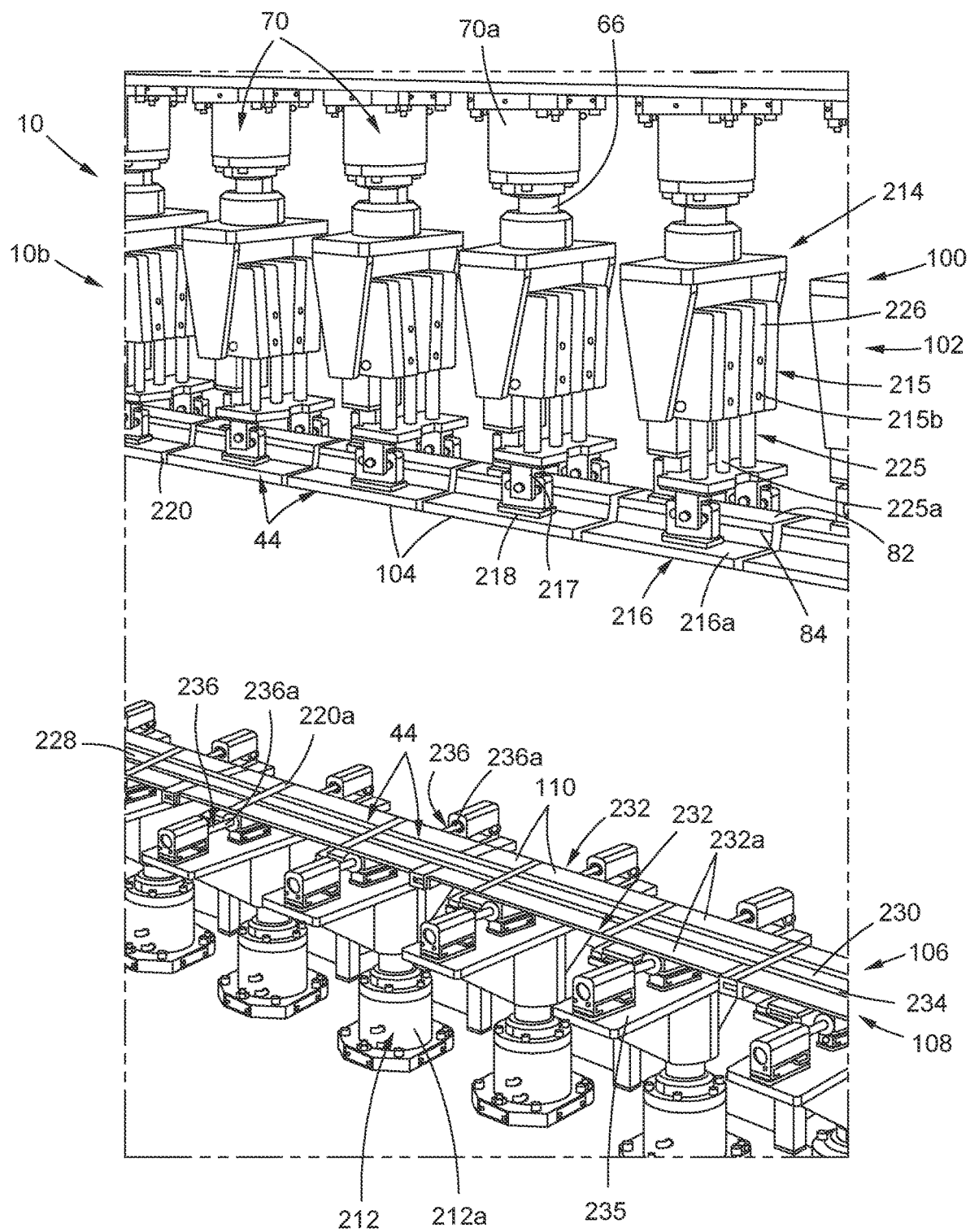
FIG. 12 is an illustration of an enlarged right side perspective view of another exemplary version of a forming apparatus of the disclosure showing a combination of a segmented upper die assembly and a segmented lower die assembly.

Now referring to FIGS. 10A-12, FIGS. 10A-12 show another exemplary version of a forming apparatus 10, such as in the form of a segmented forming apparatus 10b, for forming a composite structure 16 (see FIG. 1), such as a high contour composite structure 18 (see FIG. 1). In one version, as shown in FIG. 10A, the upper die assembly 100 comprises a segmented upper die assembly 102 that is segmented into separate and independently movable segments 44 comprising segmented upper die assembly segments 104. In another version, as shown in FIG. 11A, the lower die assembly 106 comprises a segmented lower die assembly 108 that is segmented into separate and independently movable segments 44 comprising segmented lower die assembly segments 110. In yet another version, as shown in FIG. 12, a combination 112 segmented upper die assembly/segmented lower die assembly is shown, where the upper die assembly 100 comprises the segmented upper die assembly 102 that is segmented into separate and independently movable segments 44 comprising segmented upper die assembly segments 104, and where the lower die assembly 106 comprises the segmented lower die assembly 108 that is segmented into separate and independently movable segments 44 comprising segmented lower die assembly segments 110.

The forming apparatus 10, such as the segmented forming apparatus 10b, comprises the upper die assembly 100 (see FIGS. 10A, 12) and the lower die assembly 106 (see FIGS. 11A, 12). The lower die assembly 106 is separate from, and independently movable, with respect to the upper die assembly 100, between which a composite charge 14 (see FIG. 1) is formed. The upper die assembly 100 comprises upper actuator assemblies 70 (see FIGS. 10A, 12), for example, in the form of an upper pogo array or upper pogo set, comprising a plurality of upper actuators 70a (see FIGS. 10A, 12), such as in the form of upper pogos. The lower die assembly 106 comprises lower actuator assemblies 212 (see FIGS. 11A, 12), for example, in the form of a lower pogo array or lower pogo set, comprising a plurality of lower actuators 212a (see FIGS. 11A, 12), such as in the form of lower pogos. The forming apparatus 10, such as the segmented forming apparatus 10b, further comprises a control system 60 (see FIG. 1). The control system 60 has a controller 62 (see FIG. 1) to operably control the upper actuator assemblies 70, and to operably control the lower actuator assemblies 212.

Now referring to FIGS. 10A-10B, FIG. 10A is an illustration of an enlarged front perspective view of the segmented upper die assembly 102 of the exemplary version of the forming apparatus 10, such as in the form of the segmented forming apparatus 10b, of the disclosure. FIG. 10B is an illustration of an enlarged right side perspective view of the segmented upper die assembly 102 of the forming apparatus 10, such as in the form of the segmented forming apparatus 10b, FIG. 10A.

As shown in FIGS. 10A-10B, the forming apparatus 10, such as in the form of the segmented forming apparatus 10b, comprises the upper die assembly 100. The upper die assembly 100 comprises a plurality of compressor module assemblies 214 (see FIGS. 10A-10B) comprising compressor modules 215 (see FIGS. 10A-10B) movably coupled to the upper actuator assemblies 70, and coupled to a pair 216a (see FIG. 10A) of lateral pressure plates 216 (see FIG. 10A). For example, each upper actuator assembly 70 may be attached to the pair of lateral pressure plates 216, via a bracket attachment assembly 217 (see FIG. 10A). The upper die assembly 100 further comprises a punch 82 (see FIGS. 10A-10B), or male die. As shown in FIG. 10A, the punch 82 is disposed between the pair 216a of lateral pressure plates 216, and the pair of lateral pressure plates 216 are positioned along the sides 84 of the punch 82. The upper die assembly 100 further comprises a plurality of load cells 66 (see FIGS. 10A-10B) coupled between the upper actuator assemblies 70 and the compressor modules 215. As shown in FIGS. 10A-10B, the compressor modules 215 further comprise compressor elements 218 coupled to the bracket attachment assembly 217 and configured to compress against the top surface of the pair 216a of lateral pressure plates 216. The controller 62 (see FIG. 1) of the control system 60 (see FIG. 1) operably controls the upper actuator assemblies 70 to move the compressor modules 215.

With the version shown in FIGS. 10A-10B, the upper die assembly 100 comprises the segmented upper die assembly 102 that is segmented into separate and independently movable segments 44 comprising the segmented upper die assembly segments 104. As shown in FIGS. 10A-10B, a gap 220 is formed and present between each segmented upper die assembly segment 104. In one example, the gap 220 may have a width in a range of 0.010 inch to 0.020 inch. However, the gap 220 may have another suitable width.

Each segmented upper die assembly segment 104 has its own compressor module 215, punch 82, pair 216a of lateral pressure plates 216, and upper actuator assembly 70 with an upper actuator 70a. This enables specific high contour composite structure 18, such as a stringer 20, recipes to activate and deactivate each compressor module 215. A pitch that is chosen between each compressor module 215 is based on the complexity of the curvature of the high contour composite structure 18 formed by the forming apparatus 10, such as the segmented forming apparatus 10b. Where the upper die assembly 100 is segmented and comprises the segmented upper die assembly 102, and the separate and independently movable segments 44 comprise the segmented upper die assembly segments 104, during the forming process 12 (see FIG. 1), one or more of the segmented upper die assembly segments 104 are deactivated by the controller 62 of the control system 60, and one or more of the segmented upper die assembly segments 104 are activated by the controller 62 of the control system 60. This enables in-plane bending 52 (see FIG. 1), or in-plane steering 52a (see FIG. 1), as well as in-plane bending capability 54 (see FIG. 1), or in-plane steering capability 54a (see FIG. 1) in post-forming operations 56 of the high contour composite structure 18. Further, this enables interlaminar shear and interlaminar shear of the plies 32 during post-forming operations 56 for bending 50 (see FIG. 1) of the high contour composite structure 18.

Figure 10D:
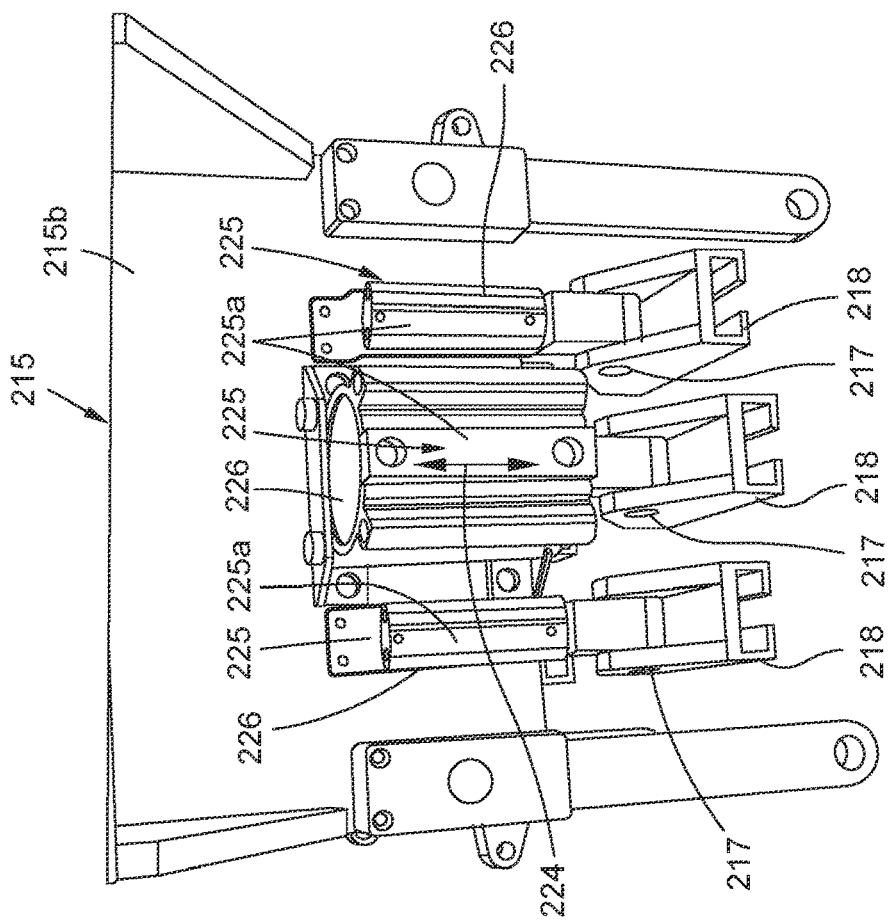
FIG. 10D is an illustration of an enlarged back perspective view of another exemplary version of a compressor module of a segmented upper die assembly.
Figure 10C:
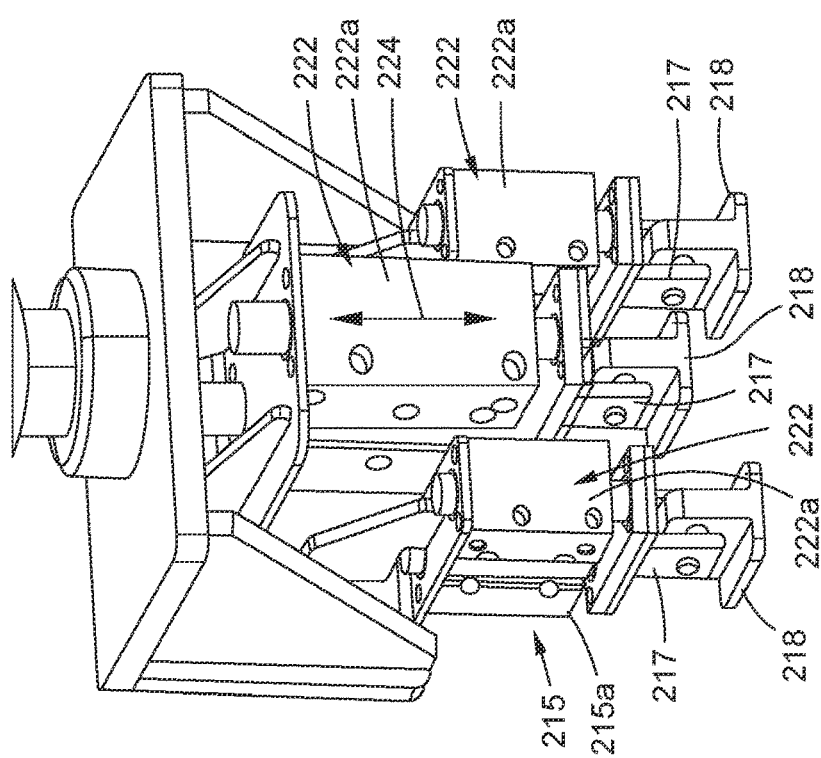
FIG. 10C is an illustration of an enlarged back perspective view of an exemplary version of a compressor module of the segmented upper die assembly of FIG. 10B.

Now referring to FIG. 10C, FIG. 10C is an illustration of an enlarged back perspective view of an exemplary version of a compressor module 215, such as in the form of an electrically controlled compressor module 215a, of the segmented upper die assembly 102 of the forming apparatus 10, such as in the form of the segmented forming apparatus 10b, of FIG. 10B. As shown in FIG. 10C, the compressor module 215, such as in the form of the electrically controlled compressor module 215a, comprises electrical drive units 222, such as servo motors 222a. The electrical drive units 222 may also comprise another suitable electrical motor or electrical drive mechanism. The electrical drive units 222, such as the servo motors 222a, are designed to move up and down in a vertical direction 224 along a z-axis of the upper actuator 70a (see FIG. 10A), such as the upper pogo. The electrical drive units 222, such as the servo motors 222a, are coupled to compressor elements 218, via the bracket attachment assemblies 217.

Now referring to FIG. 10D, FIG. 10D is an illustration of an enlarged back perspective view of another exemplary version of a compressor module 215, such as in the form of a pneumatically controlled compressor module 215b (see also FIG. 12), of a segmented upper die assembly 102 of the forming apparatus 10, such as in the form of the segmented forming apparatus 10b, of FIG. 12. As shown in FIG. 10D, the compressor module 215, such as in the form of the pneumatically controlled compressor module 215b, comprises cylinders 225, such as pneumatic cylinders 225a, in housings 226. The cylinders 225, such as pneumatic cylinders 225a, are coupled to the compressor elements 218, via the bracket attachment assemblies 217 (see FIG. 12). The cylinders 225, such as pneumatic cylinders 225a, are designed to move up and down in a vertical direction 224 along a z-axis of the upper actuator 70a, such as the upper pogo.

Now referring to FIG. 11A, FIG. 11A is an illustration of an enlarged front perspective view of the segmented lower die assembly 108 of the exemplary version of the forming apparatus 10, such as in the form of the segmented forming apparatus 10b, of the disclosure. As shown in FIG. 11A, the forming apparatus 10, such as the segmented forming apparatus 10b, comprises the lower die assembly 106, in the form of the segmented lower die assembly 108. The lower die assembly 106, in the form of the segmented lower die assembly 108, comprises a lower pallet 228 coupled to the lower actuator assemblies 212. The lower actuator assemblies 212 comprise lower actuators 212a (see FIG. 11A). The lower die assembly 106, in the form of the segmented lower die assembly 108, further comprises a presser apparatus 230 disposed between pairs 232a of die portions 232, such as in the form of die blocks, spaced apart to define a lower die cavity 234. The die portions 232 are slidably displaceable with respect to each other. The presser apparatus 230 is designed to apply an upward resistive force against a cap area 194 (see FIG. 5C0 of the composite charge 14 (see FIG. 1) during the forming process 12 (see FIG. 1) to form the high contour composite structure 18 (see FIG. 1), such as a hat-shaped stringer 20b (see FIG. 4A).

The lower die assembly 106, in the form of the segmented lower die assembly 108, further comprises a support plate 235 (see also FIG. 12) and further comprises cylinders 236 (see also FIG. 12), such as pneumatic cylinders 236a (see also FIG. 12), positioned opposite each other on the outer sides of the die portions 232. Although FIG. 11A shows two cylinders 236 opposite each other for each separate and independently movable segments 44, in other versions, more than two cylinders may be used. The controller 62 (see FIG. 1) of the control system 60 (see FIG. 1) operably controls the lower actuator assemblies 212 to move the die portions 232. The lower die assembly 106 is separate from, and independently movable, with respect to the upper die assembly 100, between which the composite charge 14 is formed.

With the version shown in FIG. 11A, the lower die assembly 106 comprises the segmented lower die assembly 108 that is segmented into separate and independently movable segments 44 comprising the segmented lower die assembly segments 110. As shown in FIG. 11A, a gap 220a is formed and present between each segmented lower die assembly segment 110. In one example, the gap 220a may have a width in a range of 0.010 inch to 0.020 inch. However, the gap 220a may have another suitable width.

Each segmented lower die assembly segment 110 has its own lower actuator assembly 212 with lower actuators 212a, die portions 232, presser apparatus 230, and cylinders 236, such as pneumatic cylinders 236a. With the segmented lower die assembly 108 comprising the segmented lower die assembly segments 110, during the forming process 12 (see FIG. 1), one or more of the pairs 232a of die portions 232 of the segmented lower die assembly segments 110 may be removed or deactivated, via a manual removal, a pneumatic control removal, an electrical control removal, or another suitable removal, to avoid pressure 46 and through thickness compaction 48 of one or more portions 14a of the composite charge 14 positioned between the upper die assembly 100 and the lower die assembly 106. The segmented lower die assembly segments 110 allow the segmented lower die assembly 108 to absorb variations in the thickness 15 (see FIG. 1) of the composite charge 14 (see FIG. 1) going down the length 114 (see FIG. 1) of the composite charge 14.

Now referring to FIG. 11B, FIG. 11B is an illustration of an enlarged back perspective view of a lower actuator assembly 212 for the segmented lower die assembly 108, of FIG. 11A. As shown in FIG. 11B, the lower actuator assembly 212 comprises lower actuators 212a, such as in the form of electrically controlled actuator modules 238. The electrically controlled actuator modules 238 are actuated via electrical drive units 240, such as servo motors 240a. The electrical drive units 240 may also comprise another suitable electrical motor or electrical drive mechanism. The electrical drive units 240, such as the servo motors 240a, are designed to move up and down in a vertical direction 242 along a z-axis of the lower actuator 212a, such as a lower pogo. The electrical drive units 240, such as the servo motors 240a, are coupled to die portions 232.

Now referring to FIG. 12, FIG. 12 is an illustration of an enlarged right side perspective view of another exemplary version of the forming apparatus 10, such as the segmented forming apparatus 10b, of the disclosure showing the combination 112 of the segmented upper die assembly 102 and the segmented lower die assembly 108. As shown in FIG. 12, the upper die assembly 100 comprises the segmented upper die assembly 102 having segmented upper die assembly segments 104, and the lower die assembly 106 comprises the segmented lower die assembly 108 having segmented lower die assembly segments 110.

As further shown in FIG. 12, each of the segmented upper die assembly segments 104 comprises a compressor module assembly 214 having a compressor module 215, such as in the form of a pneumatically controlled compressor module 215b, coupled to the upper actuator assembly 70 having an upper actuator 70a. As further shown in FIG. 12, each of the segmented upper die assembly segments 104 further comprises a pair 216a of lateral pressure plates 216, the bracket attachment assembly 217, the punch 82, a load cell 66 coupled between the upper actuator assembly 70 and the compressor module 215, and compressor elements 218 coupled to the bracket attachment assembly 217 and configured to compress against the top surface of the pair 216a of lateral pressure plates 216. FIG. 12 further shows gaps 220 between each of the segmented upper die assembly segments 104.

As further shown in FIG. 12, each of the segmented lower die assembly segments 110 comprises the lower actuator assembly 212 with the lower actuators 212a coupled to the lower pallet 228 and the pair 232a of die portions 232, and comprises the presser apparatus 230, the lower die cavity 234, the support plate 235, and the cylinders 236, such as pneumatic cylinders 236a. FIG. 12 further shows gaps 220a between each of the segmented lower die assembly segments 110.

Figure 13A:
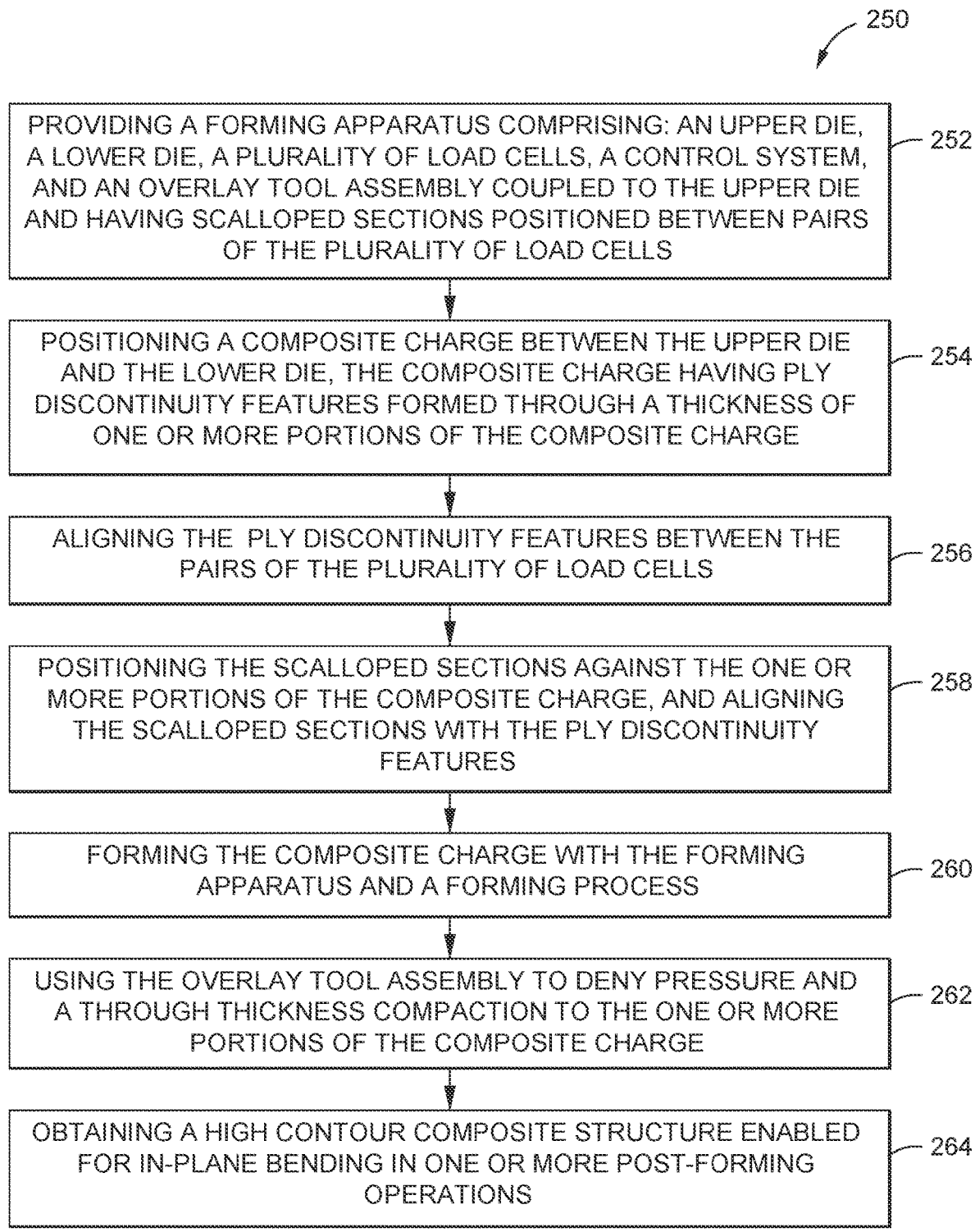
FIG. 13A is an illustration of a flow diagram of an exemplary version of a method of the disclosure.

Now referring to FIG. 13A, FIG. 13A is an illustration of a flow diagram of an exemplary version of a method 250 of the disclosure. In another version of the disclosure, there is provided the method 250 to enable in-plane bending 52 (see FIG. 1) of a composite structure 16 (see FIG. 1), such as a high contour composite structure 18 (see FIG. 1), in one or more post-forming operations 56 (see FIG. 1). The high contour composite structure 18 may comprise, as discussed above with respect to FIGS. 1, 4A-4D, one of, a stringer 20, an aircraft stringer 20a, a hat-shaped stringer 20b, a C-shaped stringer 20c, an L-shaped stringer 20d, a T-shaped stringer 20e, a stiffener member 22, a spar 24, a beam 25, or another suitable high contour composite structure.

The blocks in FIG. 13A represent operations and/or portions thereof, or elements, and lines connecting the various blocks do not imply any particular order or dependency of the operations or portions thereof, or elements. FIG. 13A and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 13A, the method 250 comprises the step of providing 252 a forming apparatus 10, such as in the form of an overlay forming apparatus 10a (see FIGS. 1, 3A-3B). The forming apparatus forming apparatus 10, such as in the form of the overlay forming apparatus 10a, comprises an upper die 72 (see FIGS. 1, 3A) and a lower die 140 (see FIG. 3A). The upper die 72 has upper die portions 145 (see FIG. 3B) that are slidably displaceable, via first actuators 68, such as contour control actuators 68a (see FIGS. 3A-3B), and the lower die 140 has pairs 165a of die blocks 165 (see FIG. 3B) spaced apart to define a die cavity 166 (see FIG. 3B), and slidably displaceable, via second actuators 156, such as shape forming actuators 156a (see FIGS. 3A-3B).

The upper die 72 may further comprise a punch 82 (see FIG. 3A) designed for at least partial insertion into the die cavity 166. The overlay sections 76 (see FIG. 1), such as the scalloped sections 76a (see FIG. 1), of the overlay tool assembly 42 are attached along sides 84 (see FIG. 5B), such as opposite sides, of the punch 82 (see FIG. 5B), or attached to the upper die 72 in another suitable location.

The forming apparatus 10, such as in the form of the overlay forming apparatus 10a, further comprises a plurality of load cells 66 (see FIG. 1) coupled to the first actuators 68, such as the contour control actuators 68a. The forming apparatus 10, such as in the form of the overlay forming apparatus 10a further comprise a control system 60 (see FIG. 1) having a controller 62 (see FIG. 1), and one or more computers 64 (see FIG. 1).

The forming apparatus 10, such as in the form of the overlay forming apparatus 10a, further comprises the overlay tool assembly 42, such as in the form of a scalloped shim overlay tool assembly 42a (see FIG. 1), coupled to the upper die 72. The overlay tool assembly 42, such as in the form of a scalloped shim overlay tool assembly 42a, has overlay sections 76, such as scalloped sections 76a, positioned between pairs 66a of the plurality of load cells 66, along a length 78 (see FIG. 1) of the upper die 72. The overlay tool assembly 42, such as in the form of a scalloped shim overlay tool assembly 42a, may further comprise a shape conversion element 85 (see FIG. 1) having a shape conversion element shape 86 (see FIG. 1), for coupling over the punch 82 (see FIG. 5B) of the upper die 72, if the punch 82 is present on the upper die 72. The shape conversion element 85 has the shape conversion element shape 86 that is different than a punch shape 88 (see FIG. 5B) of the punch 82. The shape conversion element 85 is configured to change the punch shape 88 to the shape conversion element shape 86 of the shape conversion element 85 to obtain another desired shape for forming the composite charge 14. In another version, the overlay tool assembly 42, such as in the form of a scalloped shim overlay tool assembly 42a, may further comprise a punch element 80 (see FIG. 1) designed for at least partial insertion into the die cavity 166. This version is used when the upper die 72 does not include a punch 82, or the existing punch 82 is removed from the upper die 72. The punch element 80 of the overlay tool assembly 42, such as in the form of a scalloped shim overlay tool assembly 42a, functions similarly to the punch 82 of the upper die 72, if they are the same shape, or substantially the same, shape.

As shown in FIG. 13A, the method 250 further comprises the step of positioning 254 a composite charge 14 between the upper die 72 and the lower die 140. The composite charge 14 has ply discontinuity features 90 (see FIG. 1) formed through a thickness 15 of one or more portions 14a of the composite charge 14.

The step of positioning 254 the composite charge 14 having ply discontinuity features 90 further comprises, positioning the composite charge 14 having ply discontinuity features 90 comprising one or more of, splices 92 (see FIG. 1), and relief cuts 96 (see FIG. 1), formed through the thickness 15 of the one or more portions 14a of the composite charge 14. The splices 92 comprise one of, a partial splice 92a (see FIG. 6), a full zig-zag splice 92b (see FIG. 7), or another suitable splice. The relief cuts 96 comprise one or more of, dart-shaped relief cuts 96a (see FIG. 8), diamond-shaped relief cuts 96b (see FIG. 9), or another suitable relief cut.

As shown in FIG. 13A, the method 250 further comprises the step of aligning 256 the ply discontinuity features 90 between the pairs 66a of the plurality of load cells 66.

As shown in FIG. 13A, the method 250 further comprises the step of positioning 258 the scalloped sections 76a of the overlay tool assembly 42, such as in the form of the scalloped shim overlay tool assembly 42a, against the one or more portions 14a of the composite charge 14, and aligning the scalloped sections 76a with the ply discontinuity features 90.

The step of positioning 258 the scalloped sections 76a of the overlay tool assembly 42, such as in the form of a scalloped shim overlay tool assembly 42a, against the one or more portions 14a of the composite charge 14, further comprises positioning the scalloped sections 76a of the overlay tool assembly 42, such as in the form of a scalloped shim overlay tool assembly 42a, against the one or more portions 14a comprising flange areas 174, and forming the composite charge 14 into a hat-shaped stringer 20b (see FIG. 4A) having flanges 125 (see FIG. 4A), webs 126 (see FIG. 4A), and a cap 128 (see FIG. 4A).

As shown in FIG. 13A, the method 250 further comprises the step of forming 260 the composite charge 14 with the forming apparatus 10, such as the overlay forming apparatus 10a, and the forming process 12 (see FIG. 1).

As shown in FIG. 13A, the method 250 further comprises the step of using 262 the overlay tool assembly 42, such as in the form of a scalloped shim overlay tool assembly 42a, to deny pressure 46 (see FIG. 1) and a through thickness compaction 48 (see FIG. 1) to the one or more portions 14a of the composite charge 14, during the forming process 12.

As shown in FIG. 13A, the method 250 further comprises the step of obtaining 264 the high contour composite structure 18 enabled for in-plane bending 52, or in-plane steering 52a, in one or more post-forming operations 56. The step of obtaining 264 the high contour composite structure 18 enabled for in-plane bending 52, such as in-plane steering 52a, in one or more post-forming operations 56, further comprises obtaining the high contour composite structure 18 enabled for in-plane bending 52, such as in-plane steering 52a, in one or more post-forming operations 56 comprising one or more of, bending 50 or manipulating the high contour composite structure 18 on the forming apparatus 10, such as the overlay forming apparatus 10a; or removing the high contour composite structure 18 from the forming apparatus 10, such as the overlay forming apparatus 10a, and placing the high contour composite structure 18 on a tool 58 (see FIGS. 3C-3D), such as a net shape tool 58a (see FIGS. 3C-3D), and bending 50 or manipulating the high contour composite structure 18 on the tool 58, such as the net shape tool 58a; or bending 50 or manipulating the high contour composite structure 18, after removing the high contour composite structure 18 from the forming apparatus 10, and before placing the high contour composite structure 18 on the tool 58, such as the net shape tool 58a. The post-forming operation 56 may further comprise another suitable post-forming operation.

Figure 13B:
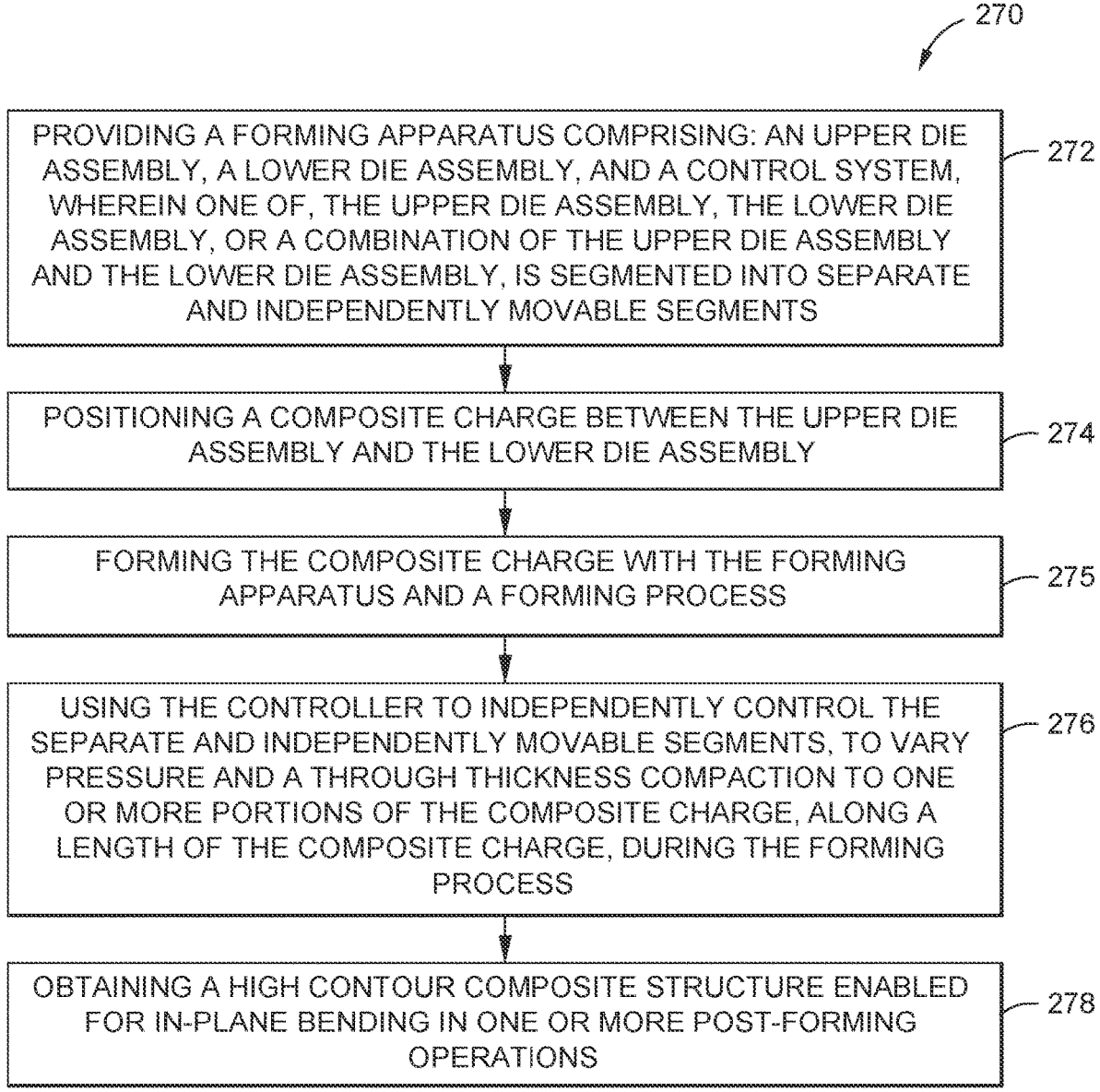
FIG. 13B is an illustration of a flow diagram of another exemplary version of a method of the disclosure.

Now referring to FIG. 13B, FIG. 13B is an illustration of a flow diagram of another exemplary version of a method 270 of the disclosure. In another version of the disclosure, there is provided the method 270 to enable in-plane bending 52 (see FIG. 1), such as in-plane steering 52a (see FIG. 1), of a high contour composite structure 18 in one or more post-forming operations 56 (see FIG. 1). The high contour composite structure 18 may comprise, as discussed above with respect to FIGS. 1, 4A-4D, one of, a stringer 20, an aircraft stringer 20a, a hat-shaped stringer 20b, a C-shaped stringer 20c, an L-shaped stringer 20d, a T-shaped stringer 20e, a stiffener member 22, a spar 24, a beam 25, or another suitable high contour composite structure.

The blocks in FIG. 13B represent operations and/or portions thereof, or elements, and lines connecting the various blocks do not imply any particular order or dependency of the operations or portions thereof, or elements. FIG. 13B and the disclosure of the steps of the method 270 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 13B, the method 270 comprises the step of providing 272 a forming apparatus 10, such as in the form of a segmented forming apparatus 10b. The forming apparatus 10, such as the segmented forming apparatus 10b, comprises an upper die assembly 100. The upper die assembly 100 comprises a plurality of compressor module assemblies 214 (see FIG. 10A) comprising compressor modules 215 (see FIG. 10A) movably coupled to upper actuator assemblies 70 (see FIG. 10A), and coupled to a pair 216a (see FIG. 10A) of lateral pressure plates 216 (see FIG. 10A), with a punch 82 (see FIG. 10A) disposed between the pair 216a of lateral pressure plates 216.

The step of providing 272 the forming apparatus 10, such as in the form of a segmented forming apparatus 10b, comprising the upper die assembly 100, further comprises providing the forming apparatus 10, such as in the form of a segmented forming apparatus 10b, comprising the upper die assembly 100 having the compressor modules 215 comprising electrically controlled compressor modules 215a (see FIG. 10C), the pneumatically controlled compressor modules 215b (see FIGS. 10D, 12), or another suitable compressor module.

The forming apparatus 10, such as the segmented forming apparatus 10b, further comprises a lower die assembly 106 (see FIG. 11A). The lower die assembly 106 comprises a lower pallet 228 (see FIG. 11A) coupled to lower actuator assemblies 212 (see FIG. 11A) having the lower actuators 212a (see FIG. 11A), and having the presser apparatus 230 (see FIG. 11A) disposed between pairs 232a (see FIG. 11A) of die portions 232 (see FIG. 11A) spaced apart to define a lower die cavity 234 (see FIG. 11A). The lower die assembly 106 is separate from the upper die assembly 100.

The forming apparatus 10, such as the segmented forming apparatus 10b, further comprises a control system 60 (see FIG. 1) having a controller 62 (see FIG. 1) and one or more computers 64 (see FIG. 1). One of, the upper die assembly 100, the lower die assembly 106, or a combination 112 of the upper die assembly 100 and the lower die assembly 106, is segmented into separate and independently movable segments 44 (see FIGS. 1, 10A, 11A).

As shown in FIG. 13B, the method 270 further comprises the step of positioning 274 a composite charge 14 between the upper die assembly 100 and the lower die assembly 106. As shown in FIG. 13B, the method 270 further comprises the step of forming 275 the composite charge 14 with the forming apparatus 10, such as the segmented forming apparatus 10b, and the forming process 12 (see FIG. 1).

As shown in FIG. 13B, the method 270 further comprises the step of using 276 the controller 62 to independently control the separate and independently movable segments 44 (see FIGS. 1, 10A, 11A), to vary pressure 46 (see FIG. 1) and a through thickness compaction 48 (see FIG. 1) to one or more portions 14a (see FIG. 1) of the composite charge 14 (see FIG. 1), along a length 114 (see FIG. 1) of the composite charge 14, during the forming process 12.

The step of using 276 the controller 62 to independently control the separate and independently movable segments 44, may further comprise using the controller 62 to independently control the separate and independently movable segments 44 comprising segmented upper die assembly segments 104 (see FIG. 10A) of a segmented upper die assembly 102 (see FIG. 10A), and wherein during the forming process 12, one or more of the segmented upper die assembly segments 104 are deactivated by the controller 62, and one or more of the segmented upper die assembly segments 104 are activated by the controller 62.

The step of using 276 the controller 62 to independently control the separate and independently movable segments 44, may further comprise using the controller 62 to independently control the separate and independently movable segments 44 comprising segmented lower die assembly segments 110 (see FIG. 11A) of a segmented lower die assembly 108 (see FIG. 11A).

The step of using 276 the controller 62 to independently control the separate and independently movable segments 44, further comprises using the controller 62 to independently control the separate and independently movable segments 44 comprising a combination 112 (see FIG. 12) of segmented upper die assembly segments 104 (see FIG. 12) of a segmented upper die assembly 102 (see FIG. 12), and segmented lower die assembly segments 110 (see FIG. 12) of a segmented lower die assembly 108 (see FIG. 12), wherein each of the segmented upper die assembly segments 104 is aligned with each of the segmented lower die assembly segments 110.

As shown in FIG. 13B, the method 270 further comprises the step of obtaining 278 the high contour composite structure 18 (see FIG. 1) enabled for in-plane bending 52 (see FIG. 1), or in-plane steering 52a (see FIG. 1), in one or more post-forming operations 56.

Now referring to FIG. 14, FIG. 14 is an illustration of a perspective view of a vehicle 280, such as the form of aircraft 280a, incorporating a high contour composite structure 18, such as in the form of an aircraft stringer 20a, made with an exemplary version of a forming apparatus 10 (see FIG. 1), such as the overlay forming apparatus 10a (see FIG. 3A), or the segmented forming apparatus 10b (see FIGS. 10A-12), and the method 250 (see FIG. 13A), and the method 270 (see FIG. 13B) of the disclosure. As shown in FIG. 14, the vehicle 280, such as the aircraft 280a, includes a fuselage 282, a nose 284, wings 286, engines 288, and a tail 290. As shown in FIG. 14, the tail 290 comprises a vertical stabilizer 292 and horizontal stabilizers 294.

The high contour composite structure 18, such as the aircraft stringer 20a, can be used individually, or in combination with other structures and devices. After the forming process 12, the high contour composite structure 18 comprising the aircraft stringer 20a is capable of bending 50 (see FIG. 1), including in-plane bending 52 (see FIG. 1), or in-plane steering 52a (see FIG. 1), in one or more post-forming operations 56 (see FIG. 1). For example, before or after each high contour composite structure 18 comprising the aircraft stringer 20a is cured, it can be loaded onto a mandrel of a machine for making a section of fuselage 282. Fiber-reinforced resin can be disposed over the high contour composite structure 18 comprising the aircraft stringer 20a, and the fiber-reinforced resin can then be cured (or co-cured with the another structure) to produce a finished assembly for the fuselage 282 of the aircraft 280a. After the high contour composite structure 18, such as in the form of an aircraft stringer 20a, has been formed, it may also be used in sections of the wings 286, the vertical stabilizer 292, the horizontal stabilizers 294, or other suitable parts of the aircraft 280a. The high contour composite structure 18 can be used in a variety of industries and applications including, but not limited to, in connection with the manufacture of aircraft 280a and other aerospace structures and vehicles, including spacecraft, and rotorcraft, as well as vehicles such as watercraft, trains, or other suitable vehicles or structures.

Figure 15:
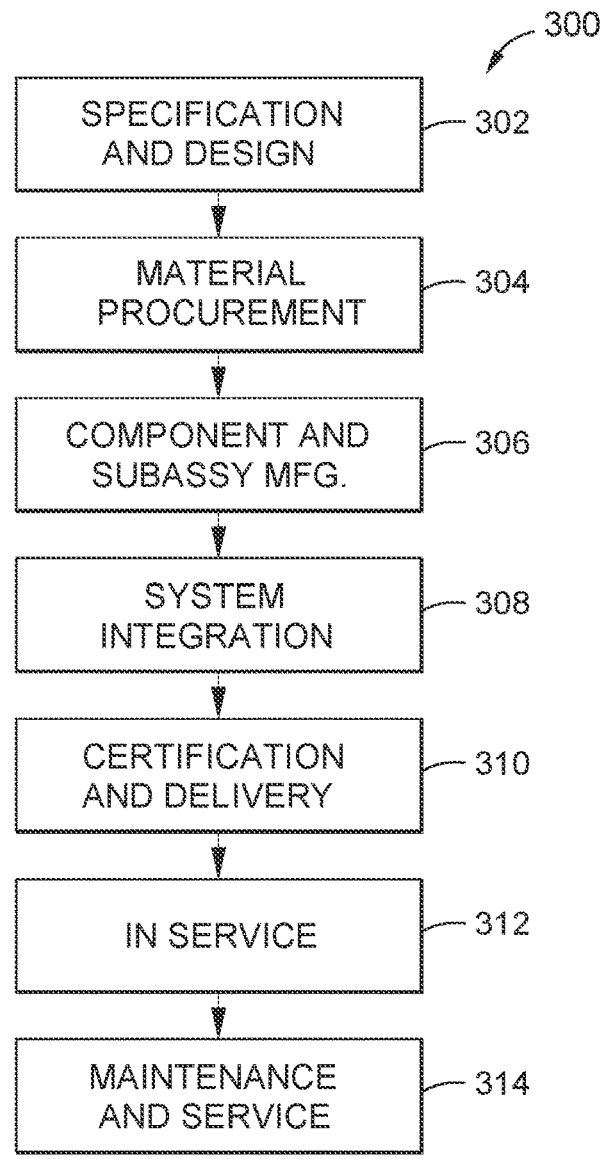
FIG. 15 is an illustration of a flow diagram of an exemplary aircraft manufacturing and service method.
Figure 16:
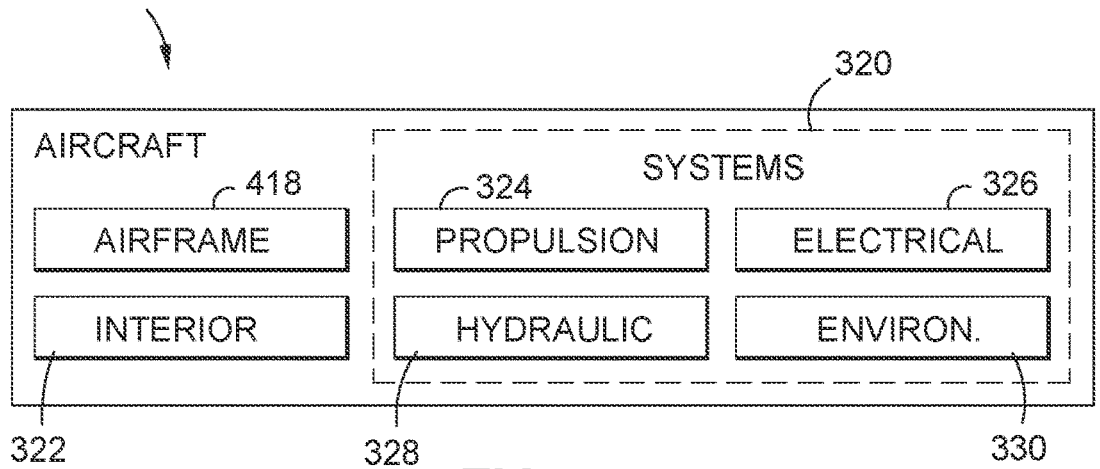
FIG. 16 is an illustration of an exemplary block diagram of an aircraft.

Now referring to FIGS. 15 and 16, FIG. 15 is an illustration of a flow diagram of an exemplary aircraft manufacturing and service method 300, and FIG. 16 is an illustration of an exemplary block diagram of an aircraft 316. Referring to FIGS. 15 and 16, versions of the disclosure may be described in the context of the aircraft manufacturing and service method 300 as shown in FIG. 15, and the aircraft 316 as shown in FIG. 16.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 16, the aircraft 316 produced by the exemplary aircraft manufacturing and service method 300 may include an airframe 418 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) provide for a forming apparatus 10 and forming process 12 (see FIG. 1) that are automated and that enable post-forming operations 56 (see FIG. 1), including bending 50 (see FIG. 1), such as in-plane bending 52 (see FIG. 1), or in-plane steering 52*a* (see FIG. 1), of high contour composite structures 18 (see FIG. 1). In one version, the forming apparatus 10, such as in the form of the overlay forming apparatus 10*a*, uses the overlay tool assembly 42 (see FIGS. 5A-5F), such as the scalloped shim overlay tool assembly 42*a* (see FIGS. 5A-5C, 5E), to exploit the soft areas between load cells 66 (see FIG. 1) of the overlay forming apparatus 10*a*, to place the overlay tool assembly 42, such as the scalloped shim overlay tool assembly 42*a*, in the soft areas, and to introduce ply discontinuity features 90 (see FIG. 5C), such as relief cuts 96 (see FIG. 5C), or splices 92 (see FIG. 6), in the flange areas 174 (see FIG. 5C) of the composite charge 14, and to align the ply discontinuity features 90, such as the relief cuts 96, to overlay sections 76 (see FIG. 5C), such as scalloped sections 76*a* (see FIG. 5C), which are aligned to low pressure zones 196*b* (see FIG. 5C), or zero pressure zones 196*c* (see FIG. 5C), of the overlay forming apparatus 10*a*. The overlay tool assembly 42, such as the scalloped shim overlay tool assembly 42*a*, denies pressure 46 (see FIG. 1) and through thickness compaction 48 (see FIG. 1) of the prepreg material 35 (see FIG. 1) of the plies 32 (see FIG. 1), to remove ply-to-ply adhesion, and to allow the relief cuts 96, to slip or slide with respect to one another in one or more post-forming operations 56.

In another version, the forming apparatus 10, such as in the form of the segmented forming apparatus 10*b*, comprises separate and independently movable segments 44 (see FIG. 1). In one example, the segmented forming apparatus 10*b* comprises the segmented upper die assembly 102 (see FIGS. 1, 10A), where the separate and independently movable segments 44 comprise segmented upper die assembly segments 104 (see FIG. 10A). In another example, the segmented forming apparatus 10*b* comprises the segmented lower die assembly 108 (see FIGS. 1, 11A), where the separate and independently movable segments 44 comprise segmented lower die assembly segments 110 (see FIG. 11A). In yet another example, the segmented forming apparatus 10*b* comprises the combination 112 (see FIG. 12) of both the segmented upper die assembly 102 and the segmented lower die assembly 108. During the forming process 12, the separate and independently movable segments 44 of one of, the segmented upper die assembly 102, the segmented lower die assembly 108, or the combination 112 of the segmented upper die assembly 102 and the segmented lower die assembly 108, are controlled, with the controller 62, to vary pressure 46 (see FIG. 1) and the through thickness compaction 48 (see FIG. 1) to the one or more portions 14*a* of the composite charge 14, along the length 114 (see FIG. 1) of the composite charge 14, to allow one or more plies 32 (see FIG. 1) in the one or more portions 14*a* to move or slip after the forming process 12, and to enable in-plane bending 52, or in-plane steering 52*a*, of the high contour composite structure 18, formed by the composite charge 14, in one or more post-forming operations 56.

In addition, disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) enable in-plane bending 52, or in-plane steering 52*a*, and increase in-plane bending capability 54, or in-plane steering capability 54*a*, of high contour composite structures 18, such as stringers 20, for example, hat-shaped stringers 20*b* (see FIG. 4A), stiffener members 22 (see FIG. 1), spars 24 (see FIG. 1), beams 25 (see FIG. 1), and other suitable contoured composite structures, in post-forming operations 56, to reduce or avoid wrinkling and/or buckling in post-forming operations 56 for the high contour composite structures 18, and to reduce or avoid out-of-plane contours 120 (see FIG. 2F). Reduction or avoidance of wrinkling and/or buckling may decrease recurring costs of repairs and inspections of such high contour composite structures 18, which, in turn, may decrease manufacturing and labor costs.

Further, disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) allow the use of composite materials 34, such as unidirectional (UD) fiber plies 32*a* (see FIG. 1), plain weave (PW) plies 32*b* (see FIG. 1), plain cross-weave (PX) plies 32*c* (see FIG. 1), unidirectional (UD)/plain weave (PW) plies 32*d* (see FIG. 1), axial tape, and other suitable axial fiber material, and hybrid layups and do not limit the material type to fabric materials, and do not limit the width of a desired stringer. Use of such composite materials 34 may decrease costs and weight, as compared to using fabric materials to form the high contour composite structures 18.

Moreover, disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) avoid having to use hand layup techniques and scarf splices, and this, in turn, may result in decreased labor, decreased time for fabrication and assembly, decreased part count, and decreased manufacturing costs. Disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) provide for alignment of forming apparatus 10 features and lamination features, such as ply discontinuity features 90, to drive reduction of in-plane compaction above slip planes 200, and allow the slip planes 200 to work in post-forming operations 56, or activities, without more expensive solutions, such as hand layup fabrication. Further, disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) provide a high rate forming solution that also overcomes forming defects where there is high curvature or contours and bending out-of-plane and in-plane in high contour composite structures 18, such as stringers 20, for example, aircraft stringers 20*a* (see FIG. 14), in the fuselage 282 ends, at converging barrels, near the nose 284 (see FIG. 14) and the tail 290 (see FIG. 14) of aircraft 280*a* (see FIG. 14). Further, disclosed versions of the forming apparatus 10 (see FIG. 1), such as the overlay forming apparatus 10*a* (see FIGS. 1, 3A-3B, 5A), the segmented forming apparatus 10*b* (see FIGS. 1, 10A, 11A, 12), the method 250 (see FIG. 13A), and the method 270 (see FIG. 13B) provide for overcoming defects in the forming of high contour composite structures 18, such as stringers 20, by relieving pressure 46 (see FIG. 1), or applying variable pressure across one or more portions 14a (see FIG. 1), such as flange areas 174 (see FIG. 5C), of a composite charge 14.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A forming apparatus for forming a high contour composite structure, the forming apparatus comprising:
    an upper die and a lower die between which a composite charge is formed, the upper die having upper die portions that are slidably displaceable, via first actuators, and the lower die having pairs of die blocks spaced apart to define a die cavity, and slidably displaceable, via second actuators;
    a plurality of load cells coupled to the first actuators, to monitor pressure applied to the composite charge by the first actuators and the second actuators;
    a control system having a controller to operably control the first actuators and the second actuators; and
    an overlay tool assembly coupled to the upper die, the overlay tool assembly having scalloped sections positioned between pairs of the plurality of load cells along a length of the upper die, and positioned against one or more portions of the composite charge during a forming process, the composite charge having ply discontinuity features formed through the one or more portions and aligned with the scalloped sections,
    wherein the overlay tool assembly denies pressure and a through thickness compaction to the one or more portions of the composite charge during the forming process, to allow one or more plies in the one or more portions to move after the forming process, and to enable in-plane bending of the high contour composite structure, formed by the composite charge, in one or more post-forming operations.

2. The forming apparatus of claim 1, wherein the upper die further comprises a punch designed for at least partial insertion into the die cavity, and the scalloped sections of the overlay tool assembly are attached along sides of the punch.

3. The forming apparatus of claim 2, wherein the overlay tool assembly further comprises a shape conversion element for coupling over the punch, the shape conversion element having a shape conversion element shape that is different than a punch shape of the punch.

4. The forming apparatus of claim 1, wherein the overlay tool assembly further comprises a punch element designed for at least partial insertion into the die cavity.

5. The forming apparatus of claim 1, wherein the ply discontinuity features comprise splices formed through a thickness of the one or more portions of the composite charge, the splices comprising one of a partial splice, and a full zig-zag splice.

6. The forming apparatus of claim 1, wherein the ply discontinuity features comprise relief cuts formed in the one or more plies through a thickness of the one or more portions of the composite charge, the relief cuts comprising one or more of dart-shaped relief cuts, and diamond-shaped relief cuts.

7. The forming apparatus of claim 1, wherein the scalloped sections of the overlay tool assembly are positioned against flange areas of the composite charge, and the composite charge is formed into a hat-shaped stringer having flanges, webs, and a cap.

8. The forming apparatus of claim 7, wherein the ply discontinuity features are formed in the flange areas prior to the forming process.

9. The forming apparatus of claim 1, wherein the high contour composite structure comprises one of a stringer, an aircraft stringer, a hat-shaped stringer, a C-shaped stringer, an L-shaped stringer, a T-shaped stringer, a stiffener member, a spar, and a beam.

10. A forming apparatus for forming a high contour composite structure, the forming apparatus comprising:
    an upper die assembly comprising a plurality of compressor module assemblies comprising compressor modules movably coupled to upper actuator assemblies, and coupled to a pair of lateral pressure plates, with a punch disposed between the pair of lateral pressure plates;
    a lower die assembly comprising a lower pallet coupled to lower actuator assemblies, and having a presser apparatus disposed between pairs of die portions spaced apart to define a lower die cavity, the die portions being slidably displaceable with respect to each other, and the lower die assembly being separate from the upper die assembly, between which a composite charge having ply discontinuity features formed through one or more portions is formed;
    a plurality of load cells coupled to, and aligned between, the upper actuator assemblies and the compressor modules of the upper die assembly, to monitor pressure applied to the composite charge by the upper actuator assemblies; and
    a control system having a controller to operably control the upper actuator assemblies and the lower actuator assemblies,
    wherein the upper die assembly, the lower die assembly, or a combination of the upper die assembly and the lower die assembly, is segmented into separate and independently movable segments having gaps formed between the separate and independently movable segments, and the separate and independently movable segments are controlled, with the controller, to vary pressure and a through thickness compaction to the one or more portions of the composite charge, along a length of the composite charge, during a forming process, to allow one or more plies in the one or more portions to move after the forming process, and to enable in-plane bending of the high contour composite structure, formed by the composite charge, in one or more post-forming operations.

11. The forming apparatus of claim 10, wherein the upper die assembly is segmented and comprises a segmented upper die assembly, and the separate and independently movable segments comprise segmented upper die assembly segments, wherein during the forming process, one or more of the segmented upper die assembly segments are deactivated by the controller, and one or more of the segmented upper die assembly segments are activated by the controller.

12. The forming apparatus of claim 10, wherein the compressor modules comprise electrically controlled compressor modules, or pneumatically controlled compressor modules.

13. The forming apparatus of claim 10, wherein the lower die assembly is segmented and comprises a segmented lower die assembly, and the separate and independently movable segments comprise segmented lower die assembly segments.

14. The forming apparatus of claim 10, wherein the combination of the upper die assembly and the lower die assembly is segmented, and the upper die assembly comprises a segmented upper die assembly, and the separate and independently movable segments comprise segmented upper die assembly segments, and the lower die assembly comprises a segmented lower die assembly, and the separate and independently movable segments comprise segmented lower die assembly segments, and further wherein each of the segmented upper die assembly segments is aligned with each of the segmented lower die assembly segments.

15. A method to enable in-plane bending of a high contour composite structure in one or more post-forming operations, the method comprising the steps of:
   providing a forming apparatus comprising:
      an upper die and a lower die between which a composite charge is formed, the upper die having upper die portions that are slidably displaceable, via first actuators, and the lower die having pairs of die blocks spaced apart to define a die cavity, and slidably displaceable, via second actuators;
      a plurality of load cells coupled to the first actuators, to monitor pressure applied to the composite charge by the first actuators and the second actuators;
      a control system having a controller to operably control the first actuators and the second actuators; and
      an overlay tool assembly coupled to the upper die, the overlay tool assembly having scalloped sections positioned between pairs of the plurality of load cells along a length of the upper die, and positioned against one or more portions of the composite charge during a forming process;
   positioning the composite charge between the upper die and the lower die, the composite charge having ply discontinuity features formed through a thickness of one or more portions of the composite charge;
   aligning the ply discontinuity features between the pairs of the plurality of load cells;
   positioning the scalloped sections of the overlay tool assembly against the one or more portions of the composite charge, and aligning the scalloped sections with the ply discontinuity features;
   forming the composite charge with the forming apparatus and a forming process;
   using the overlay tool assembly to deny pressure and a through thickness compaction to the one or more portions of the composite charge during the forming process, to allow one or more plies in the one or more portions to move after the forming process; and
   obtaining the high contour composite structure, formed by the composite charge, enabled for the in-plane bending in the one or more post-forming operations.

16. The method of claim 15, wherein positioning the composite charge having ply discontinuity features further comprises, positioning the composite charge having ply discontinuity features comprising one or more of splices, and relief cuts, formed through the thickness of the one or more portions of the composite charge.

17. The method of claim 15, wherein positioning the scalloped sections of the overlay tool assembly against the one or more portions of the composite charge further comprises, positioning the scalloped sections of the overlay tool assembly against the one or more portions comprising flange areas, and forming the composite charge into a hat-shaped stringer having flanges, webs, and a cap.

18. The method of claim 15, wherein obtaining the high contour composite structure enabled for in-plane bending in one or more post-forming operations further comprises, obtaining the high contour composite structure enabled for in-plane bending in one or more post-forming operations comprising one or more of:
   bending the high contour composite structure on the forming apparatus;
   removing the high contour composite structure from the forming apparatus, and placing the high contour composite structure on a tool, and bending the high contour composite structure on the tool; or
   bending the high contour composite structure, after removing the high contour composite structure from the forming apparatus, and before placing the high contour composite structure on the tool.

19. A method to enable in-plane bending of a high contour composite structure in one or more post-forming operations, the method comprising the steps of:
   providing a forming apparatus comprising:
      an upper die assembly comprising a plurality of compressor module assemblies comprising compressor modules movably coupled to upper actuator assemblies, and coupled to a pair of lateral pressure plates, with a punch disposed between the pair of lateral pressure plates;
      a lower die assembly comprising a lower pallet coupled to lower actuator assemblies, and having a presser apparatus disposed between pairs of die portions spaced apart to define a lower die cavity, the die portions being slidably displaceable with respect to each other, and the lower die assembly being separate from the upper die assembly, between which a composite charge having ply discontinuity features formed through one or more portions is formed;
      a plurality of load cells coupled to, and aligned between, the upper actuator assemblies and the compressor modules of the upper die assembly, to monitor pressure applied to the composite charge by the upper actuator assemblies; and
      a control system having a controller to operably control the upper actuator assemblies and the lower actuator assemblies,
      wherein one of the upper die assembly, the lower die assembly, or a combination of the upper die assembly and the lower die assembly, is segmented into separate and independently movable segments having gaps formed between the separate and independently movable segments;
   positioning the composite charge between the upper die assembly and the lower die assembly;
   forming the composite charge with the forming apparatus and a forming process;
   using the controller to independently control the separate and independently movable segments, to vary pressure and a through thickness compaction to the one or more portions of the composite charge, along a length of the composite charge, during the forming process, to allow one or more plies in the one or more portions to move after the forming process; and obtaining the high contour composite structure, formed by the composite charge, enabled for the in-plane bending in the one or more post-forming operations.

20. The method of claim 19, wherein providing the forming apparatus comprising the upper die assembly, further comprises providing the forming apparatus comprising the upper die assembly having compressor modules comprising electrically controlled compressor modules, or pneumatically controlled compressor modules.

21. The method of claim 19, wherein using the controller to independently control the separate and independently movable segments further comprises, using the controller to independently control the separate and independently movable segments comprising segmented upper die assembly segments of a segmented upper die assembly, and wherein during the forming process, one or more of the segmented upper die assembly segments are deactivated by the controller, and one or more of the segmented upper die assembly segments are activated by the controller.

22. The method of claim 19, wherein using the controller to independently control the separate and independently movable segments further comprises, using the controller to independently control the separate and independently movable segments comprising segmented lower die assembly segments of a segmented lower die assembly.

23. The method of claim 19, wherein using the controller to independently control the separate and independently movable segments, further comprises using the controller to independently control the separate and independently movable segments comprising a combination of segmented upper die assembly segments of a segmented upper die assembly, and segmented lower die assembly segments of a segmented lower die assembly, wherein each of the segmented upper die assembly segments is aligned with each of the segmented lower die assembly segments.

* * * * *